(12) United States Patent
Kim et al.

(10) Patent No.: US 11,726,625 B2
(45) Date of Patent: Aug. 15, 2023

(54) TOUCH MEMBER AND A DISPLAY DEVICE INCLUDING THE TOUCH MEMBER

(71) Applicant: SAMSUNG DISPLAY CO., LTD., Yongin-si (KR)

(72) Inventors: Ga Young Kim, Hwaseong-si (KR); Sang Hyun Lim, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/590,009

(22) Filed: Feb. 1, 2022

(65) Prior Publication Data

US 2022/0404931 A1  Dec. 22, 2022

(30) Foreign Application Priority Data

Jun. 21, 2021 (KR) .......................... 10-2021-0080093

(51) Int. Cl.
*G06F 3/044* (2006.01)
*G06F 3/041* (2006.01)

(52) U.S. Cl.
CPC .......... *G06F 3/0446* (2019.05); *G06F 3/0442* (2019.05); *G06F 3/0445* (2019.05)

(58) Field of Classification Search
CPC ........ G06F 3/041; G06F 3/044; G06F 3/0446; G06F 3/0442; G06F 3/0445
See application file for complete search history.

(56) References Cited

U.S. PATENT DOCUMENTS

| 8,970,549 B2 | 3/2015 | Lee et al. | |
| 2009/0085891 A1* | 4/2009 | Yang | G06F 3/0412 345/174 |
| 2011/0261010 A1* | 10/2011 | Nishitani | G06F 3/0445 345/174 |
| 2013/0106747 A1* | 5/2013 | Choi | G06F 3/0446 345/173 |
| 2014/0035863 A1* | 2/2014 | Li | G06F 3/04162 345/174 |
| 2015/0049044 A1* | 2/2015 | Yousefpor | G06F 3/04186 345/174 |
| 2015/0169111 A1* | 6/2015 | Hashimoto | G06F 3/0445 345/174 |
| 2015/0305138 A1* | 10/2015 | Tombs | H05K 3/107 29/850 |

(Continued)

*Primary Examiner* — Md Saiful A Siddiqui
(74) *Attorney, Agent, or Firm* — F. Chau & Associates, LLC

(57) ABSTRACT

A touch member including: first and second electrodes in a touch sensor area; touch pad areas in a touch peripheral area; and routing lines in the touch peripheral area to connect the first and second electrodes with the touch pad areas, wherein the routing lines include a (1-1), (1-2), (2-1), and (2-2) routing line, the first electrode includes a (1-1) electrode having a first end not routing line, connected and a second end connected to the (1-1) routing line, and a (1-2) electrode having a first end connected to the (1-2) routing line and a second end not routing line connected, the second electrode includes a (2-1) electrode having a first end connected to the (2-1) routing line and a second end not routing line connected, and a (2-2) electrode having a first end not routing line connected and a second end connected to the (2-2) routing line.

18 Claims, 27 Drawing Sheets

(56) References Cited

U.S. PATENT DOCUMENTS

| | | | | |
|---|---|---|---|---|
| 2016/0132158 A1* | 5/2016 | Jang | ............ | G06F 3/0446 |
| | | | | 345/174 |
| 2017/0139525 A1* | 5/2017 | Jo | ............ | G06F 3/0443 |
| 2018/0299978 A1* | 10/2018 | Tseng | ............ | G06F 3/04166 |
| 2019/0004666 A1* | 1/2019 | Jiang | ............ | G06F 3/0442 |
| 2019/0204939 A1* | 7/2019 | Ju | ............ | G06F 3/04883 |

* cited by examiner

TOUCH MEMBER AND A DISPLAY DEVICE INCLUDING THE TOUCH MEMBER

This application claims priority under 35 U.S.C. § 119 to Korean Patent Application No. 10-2021-0080093 filed on Jun. 21, 2021 in the. Korean Intellectual Property Office, the disclosure of which is incorporated by reference herein in its entirety.

1. Technical Field

The disclosure relates to a touch member and a display device including the same.

2. Description of the Related Art

A display device is an output device for presentation of information in visual form. Display devices have been increasingly used as the information-oriented society evolves. For example, display devices are being employed in a variety of electronic devices such as smart phones, digital cameras, laptop computers, navigation devices, and smart televisions.

Display devices may include a touch panel to support a touch input from a part of a user's body (e.g., finger) and a touch input using an electronic pen. The touch panel determines whether a user's touch input is received, and, if any, finds the coordinates of the position of the touch input. The touch panel may also determine whether a touch input using an electronic pen is received, and, if any, finds the coordinates of the position of the touch input.

SUMMARY

Embodiments of the disclosure provide a touch member capable of electrically sensing a variety of types of touch events in a simplified structure.

Embodiments of the disclosure also provide a display device capable of electrically sensing a variety of types of touch events in a simplified structure.

According to an embodiment of the disclosure, there is provided a touch member including: a first electrode disposed in a touch sensor area and extending in a first direction; a second electrode disposed in the touch sensor area and extending in a second direction crossing the first direction; touch pad areas located in a touch peripheral area around the touch sensor area; and routing lines located in the touch peripheral area to connect the first electrode and the second electrode with the touch pad areas, wherein the routing lines include a (1-1) routing line, a (1-2) routing line, a (2-1) routing line, and a (2-2) routing line, the first electrode includes a (1-1) electrode having a first end not connected to the routing lines and a second end connected to the (1-1) routing line, and a (1-2) electrode having a first end connected to the (1-2) routing line and a second end not connected to the routing lines, the second electrode includes a (2-1) electrode having a first end connected to the (2-1) routing line and a second end not connected to the routing lines, and a (2-2) electrode having a first end not connected to the routing lines and a second end connected to the (2-2) routing line, the (1-1) electrode and the (1-2) electrode are alternately arranged in the second direction, and the (2-1) electrode and the (2-2) electrode are alternately arranged in the first direction.

The (1-1) electrode and the (1-2) electrode may each include first sensor portions arranged in the first direction and first connecting portions connecting between adjacent ones of the first sensor portions, and the (2-1) electrode and the (2-2) electrode may each include second sensor portions arranged in the second direction and second connecting portions connecting between adjacent ones of the second sensor portions.

The touch pad areas may include a (1-1) touch pad area including at least one touch pad connected to the (1-1) routing line; a (1-2) touch pad area including at least one touch pad connected to the (1-2) routing line; a (2-1) touch pad area including at least one touch pad connected to the (2-1) routing line; and a (2-2) touch pad area including at least one touch pad connected to the (2-2) routing line, wherein the (1-2) touch pad area, the (2-1) touch pad area, the (1-1) touch pad area, the (2-2) touch pad area and the (1-2) touch pad area may be arranged sequentially in the second direction in the touch pad areas.

The (1-2) routing line may be extended around at least one edge of the touch sensor area.

The touch member may further include a touch driving circuit for driving the first electrode and the second electrode.

The touch driving circuit may include a first driving signal supplying unit for providing a first-mode driving signal to the first electrode in a first mode; and a first sensing signal receiving unit for receiving a first-mode sensing signal from the second electrode in the first mode, The touch driving circuit may further include a second driving signal supplying unit for providing a second-mode driving; signal to the first electrode and the second electrode in a second mode; and a second sensing signal receiving unit for receiving a second-mode sensing signal from the first electrode and the second electrode in the second mode.

The second-mode sensing signal received from the first electrode may include odd-numbered column data and even-numbered column data, and the touch driving circuit may select one of the odd-numbered column data and the even-numbered column data as first coordinate axis sensing data, and the second-mode sensing signal received from the second electrode may include odd-numbered row data and even-numbered Tow data, and the touch driving circuit may select one of the odd-numbered row data and the even-numbered row data as second coordinate axis sensing data.

A touch driving period may include a touch recognition period, a first-mode sensing period and a second-mode sensing period, and wherein the touch .recognition period includes a standby period, a first mode period shorter than the standby period, and a second mode period shorter than the standby period, wherein only sensing for an input by a part of a body may be made in the first mode period and only sensing for an input by an electronic pen may be made in the second mode period.

The touch member may further include an auxiliary electrode located in the touch peripheral area, and having a first end connected to the touch pad areas and a second end not connected to the first or second electrode.

The auxiliary electrode may be adjacent to an outer side of the routing lines.

According to an embodiment of the disclosure, there is provided a display device including: a display unit; and a touch sensing unit disposed on the display unit, wherein the touch sensing unit includes: a first electrode disposed in a touch sensor area and extending in a first direction; a second electrode disposed in the touch sensor area and extending in a second direction crossing the first direction; touch pad areas located in a touch peripheral area around the touch sensor area; and routing lines located in the touch peripheral area to connect the first electrode and the second electrode with the touch pad areas, wherein the routing lines include a (1-1) routing line, a (1-2) routing line, a (2-1) routing line, and a (2-2) routing line, the first electrode includes a (1-1) electrode having a first end not connected to the routing line and a second end connected to the (1-1) routing line, and a (1-2) electrode having a first end connected to the (1-2) routing line and a second end not connected to the routing lines, the second electrode includes a (2-1) electrode having a first end connected to the (2-1) routing line and a second end not connected to the routing lines, and a (2-2) electrode having a first end not connected to the routing lines and a second end connected to the (2-2) routing line, the (1-1) electrode and the (1-2) electrode are alternately arranged in the second direction, and the (2-1) electrode and the (2-2) electrode are alternately arranged in the first direction.

The display unit may include a plurality of pixels each including an emission area and a non-emission area around the emission area, wherein the touch sensing unit may include a first touch conductive layer, a second touch conductive layer, and a touch insulating layer interposed between the first touch conductive layer and the second touch conductive layer, and wherein the first touch conductive layer and the second touch conductive layer may not overlap the emission area.

The (1-1) electrode and the (1-2) electrode may each include first sensor portions arranged in the first direction and first connecting portions connecting between adjacent ones of the first sensor portions, the (2-1) electrode and the (2-2) electrode may each include second sensor portions arranged in the second direction and second connecting portions connecting between adjacent ones of the second sensor portions, the first connecting portions may be formed of the first touch conductive layer, and the first sensor portions, the second sensor portions and the second connecting portions may he formed of the second touch conductive layer, and the routing lines may include at least one of the first touch conductive layer and the second touch conductive layer.

The display device may further include an auxiliary electrode located in the touch peripheral area, and having a first end connected to the touch pad areas and a second end not connected to the first or second electrode, wherein the auxiliary electrode is disposed on an outer side of the routing lines.

The (1-2) routing line may be extended around at least one edge of the touch sensor area.

The display device may further include: a touch driving circuit for driving the first electrode and the second electrode, wherein the touch driving; circuit drives in a first mode that is a body input sensing mode and a second mode that is an electronic pen input sensing mode, and the touch driving circuit include a first driving signal supplying unit for providing a first-mode driving signal to the first electrode in the first mode, a first sensing signal receiving unit for receiving a first-mode sensing signal from the second electrode in the first mode, a second driving signal supplying unit for providing a second-mode driving signal to the first electrode and the second electrode in the second mode, and a second sensing signal receiving unit for receiving a second-mode sensing signal from the first electrode and the second electrode in the second mode.

According to an embodiment of the disclosure, there is provided a display device including: a display panel including a display unit and a touch sensing unit disposed on the display unit; a window disposed on the display panel; a panel bottom member disposed under the display panel and including at least one of a heat dissipation sheet, an electromagnetic wave shielding sheet, and a buffer sheet; and a mold frame accommodating the display panel, the window and the panel bottom member, wherein the touch sensing unit includes: a first electrode disposed in a touch sensor area and extended in a first direction; a second electrode disposed in the touch sensor area and extended in a second direction crossing the first direction; touch pad areas located in a touch peripheral area around the touch sensor area; and routing lines located in the touch peripheral area to connect the first electrode and the second electrode with the touch pad areas, wherein the routing lines include a (1-1) routing line, a (1-2) routing line, a (2-1) routing line, and a (2-2) routing line, the first electrode include a (1-1) electrode having a first end not connected to the routing lines and a second end connected to the (1-1) routing line, and a (1-2) electrode having a first end connected to the (1-2) routing line and a second end not connected to the routing lines, the second electrode includes a (2-1) electrode having a first end connected to the (2-1) routing line and a second end not connected to the routing lines, and a (2-2) electrode having a first end not connected to the routing lines and a second end connected to the (2-2) routing line, the (1-1) electrode and the (1-2) electrode are alternately arranged in the second direction, and the (2-1) electrode and the (2-2) electrode are alternately arranged in the first direction.

The (1-2) routing line may be extended around at least one edge of the touch sensor area.

The display device may further include: a touch driving circuit for driving the first electrode and the second electrode, wherein the touch driving circuit comprises a first driving signal supplying unit for providing, a first-mode driving signal to the first electrode in the first mode, a first sensing signal receiving; unit for receiving a first-mode sensing signal from the second electrode in the first mode, a second driving signal supplying unit for providing a second-mode driving signal to the first electrode and the second electrode in the second mode, and a second sensing signal receiving unit for receiving a second-mode sensing signal from the first electrode and the second electrode in the second mode.

BRIEF DESCRIPTION OF THE DRAWINGS

The above and other features of the disclosure will become more apparent by describing in detail embodiments thereof with reference to the attached drawings, in which.

DETAILED DESCRIPTION OF THE EMBODIMENTS

The disclosure will now be described more fully hereinafter with reference to the accompanying drawings, in which embodiments are shown. This disclosure may, however, be embodied in different forms and should not be construed as limited to the embodiments set forth herein.

It will also be understood that when a layer is referred to as being "on" another layer or substrate, it can be directly on the other layer or substrate, or intervening layers may also be present. The same reference numbers may indicate the same components throughout the specification.

It will be understood that, although the terms "first," "second," etc. may be used herein to describe various elements, these elements should not be limited by these terms. These terms may be used to distinguish one element from another element. For instance, a first element discussed below could be termed a second element. Similarly, the second element could also be termed the first element.

Figure 1:
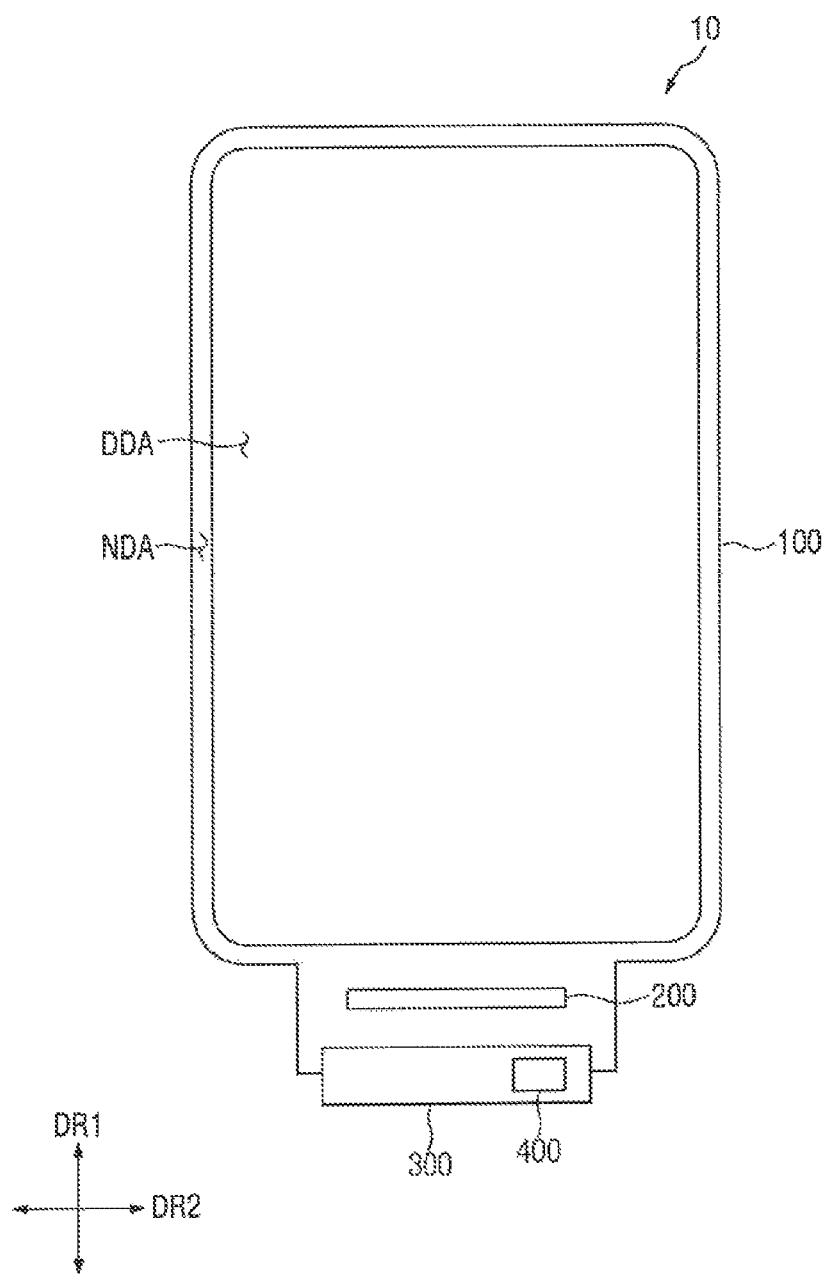
FIG. 1 is a plan view of a display device according to an embodiment of the disclosure.
Figure 2:
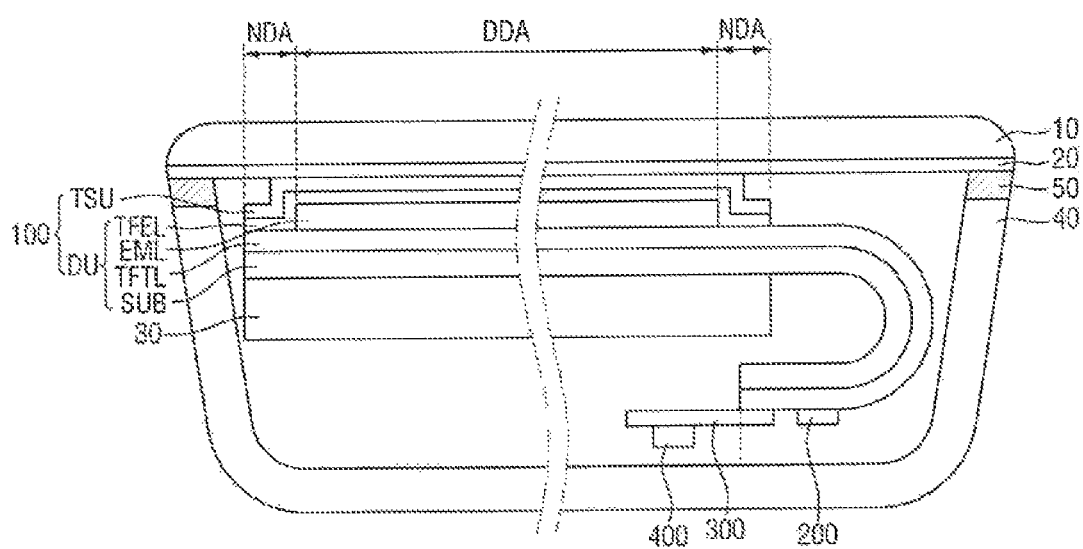
FIG. 2 is a cross-sectional view of a display device according to an embodiment of the disclosure.

FIG. 1 is a plan view of a display device according to an embodiment of the disclosure. FIG. 1 is a plan view showing a display panel of a display device. FIG. 2 is a cross-sectional view of a display device according to an embodiment of the disclosure.

Referring to FIGS. 1 and 2, a display device 1 may include a variety of electronic devices providing a display screen. Examples of the display device 1 include, but are not limited to, a mobile phone, a smart phone, a tablet personal computer (PC), a mobile communications terminal, an electronic organizer, an e-book, a personal digital assistant (PDA), a portable multimedia player (PMP), a navigation device, an ultra mobile PC (UMPC), a television set, a game machine, a wristwatch-type electronic device, a head-mounted display, a personal computer monitor, a laptop computer, a vehicle instrument cluster, a digital camera, a camcorder, an outdoor billboard, an electronic billboard, various medical apparatuses, various inspection devices, various home appliances including a display area such as a refrigerator and a laundry machine, Internet of things (IoT) devices, etc.

The display device 1 may have a quadrangular or similar shape when viewed from the top. For example, the display device 1 may have a quadrangular shape having longer sides in the first direction DR1 and shorter sides in the second direction DR2 when viewed from the top. The corners where the longer sides in the first direction DR1 meet the shorter sides in the second direction DR2 may be rounded with a predetermined curvature or may have a right angle. The shape of the display device 1 when viewed from the top is not limited to a quadrangular shape, but may be formed in other polygonal shapes, a circular shape, an elliptical shape or a shape similar.

In the plan view of FIG. 1, the first direction DR1 and the second direction DR2 perpendicular to the first direction DR1 is shown. In the following description, a first side in the first direction DR1 indicates the upper side of the display device 1 when viewed from the top, a second side in the first direction DR1 indicates the lower side of the display device 1 when viewed from the top, a first side in the second direction DR2 indicates the left side of the display device 1 when viewed from the top, and a second side in the second direction DR2 indicates the right side of the display device 1 when viewed from the top, for convenience of illustration.

The display device 1 may include a display panel 100, a display driving circuit 200, a circuit board 100 and a touch driving circuit 400. The display panel 100 may include a display area DDA having pixels for displaying images, and a non-display area NDA disposed around the display area DDA. The display area DDA may overlap a touch sensor area TSA (see FIG. 3) in which a touch input is sensed, which will be described later. Herein, a touch input may include a touch input by a part of a user's body (e.g., a finger) and a touch input by an electronic pen (e.g., a stylus pen). As used herein, the term "touch" encompasses direct contact with an object as well as proximity to the object. For example, for an electronic pen, a touch input may be recognized as having been made when the electronic pen is proximate to the upper surface of the display device 1 without direct contact.

The non-display area NDA is disposed around the display area DDA. The non-display area NDA may be a bezel. in the non-display area NDA, signal lines or driving circuits for applying signals to the display area DDA or touch sensor area TSA may be disposed. In addition, conductive lines for providing, a wireless charging function may be disposed in the non-display area NDA. The conductive lines for providing a wireless charging function may be used to charge an electronic pen.

The display driving circuit 200 may output signals and voltages for driving the display panel 100. The display driving circuit 200 may apply data voltages to data lines. The display driving circuit 200 may apply a supply voltage to a voltage line and may supply a gate control signal to a gate driver. The display driving circuit 200 may be implemented as an integrated circuit (IC) and may be attached on the display panel 100 by a chip-on-glass (COG) technique, a chip-on-plastic (COP) technique, or ultrasonic bonding. As another example, the display driving circuit 200 may be mounted on the circuit board 300.

The circuit board 300 may be attached on the pads of the display panel 100 using an anisotropic conductive film (ACF). Lead lines of the circuit board 300 may be electrically connected to a pad area of the display panel 100. The circuit board 300 may be a flexible printed circuit board (FPCB) or a flexible film such as a chip-on-film (COF).

The touch driving circuit 400 may be mounted on the circuit board 300. The touch driving circuit 400 may be connected to a touch sensing unit TSU of the display panel 100. The touch driving circuit 400 may be implemented as an integrated circuit (IC).

The display panel 100 may have flexible characteristics and may be bent partially. For example, as shown in FIG. 2, a pad area of the display panel 100 where the display driving circuit 200 and the circuit board 300 are attached may be bent toward the rear side of the display device 1. The bent pad area of the display panel 100 may overlap display unit DU in the thickness direction, but the disclosure is not limited thereto.

The display panel 100 may include the display unit DU and the touch sensing unit TSU. The display unit DU may include a thin-film transistor layer TFTL disposed on a substrate SUB. The thin-film transistor layer TFTL may include a plurality of thin-film transistors for driving an emissive layer EML of a pixel.

An encapsulation layer TFEL may be disposed on the emission layer TFEL. The encapsulation layer TFEL may include a stack of an inorganic film and an organic film.

The touch sensing unit TSU may be disposed on the encapsulation layer TFEL. The touch sensing unit TSU is a layer where a touch input is made and may function as a touch member. The touch sensing unit TSU may include a plurality of electrodes IE1 and IE2 (see FIG. 3).

In some embodiments of the disclosure, the display device 1 may further include a window 10 disposed on the display panel 100, a transparent coupling member 20 interposed between the window 10 and the display panel 100 to couple them to each other, a panel bottom member 30 disposed under the display panel 100, and a mold frame 40 (or a bracket) disposed below the panel bottom member 30 to accommodate the display panel 100 and the panel bottom member 30.

The window 10 is disposed to cover the upper surface of the display panel 100. The window 10 may be size larger than the display panel 100 when viewed from the top to completely cover the display panel 100 and may protrude from the edges of the display panel 100.

The window 10 may be made of either a rigid material or a flexible material. The window 10 may be made of, for example, glass, sapphire and/or plastic.

The transparent coupling member 20 is interposed between the window 10 and the display panel 100 to couple them to each other. The transparent coupling member 20 may include an optically clear adhesive (OCA) or an optically clear resin (OCR). The transparent coupling member 20 may completely overlap the window 10.

An optical member such as a polarizing member may be further interposed between the display panel 100 and the transparent coupling member 20.

The panel bottom member 30 may be disposed under the display panel 100. The panel bottom member 30 may perform a heat dissipation function, an electromagnetic-wave-blocking function, a buffering function, etc. The panel bottom member 30 may include a functional layer having at least one of the above-described functions. The functional layer may have a variety of forms such as a layer, a film and a sheet. The panel bottom member 30 may include, for example, at least one of a heat dissipation sheet, an electromagnetic wave shielding sheet, and a buffer sheet.

The mold frame 40 may be disposed below the panel bottom member 30. The mold frame 40 may accommodate the display panel 100 and the panel bottom member 30, The mold frame 40 may be coupled with the window 10 or the transparent coupling member 20. For example, a waterproof tape 50 or waterproof resin is interposed between the end of the mold frame 40 and the window 10, such that the mold frame 40 and the window 10 may be coupled together by the waterproof tape 50 or waterproof resin.

Hereinafter, the above-described touch sensing unit TSU will be described in detail.

Figure 3:
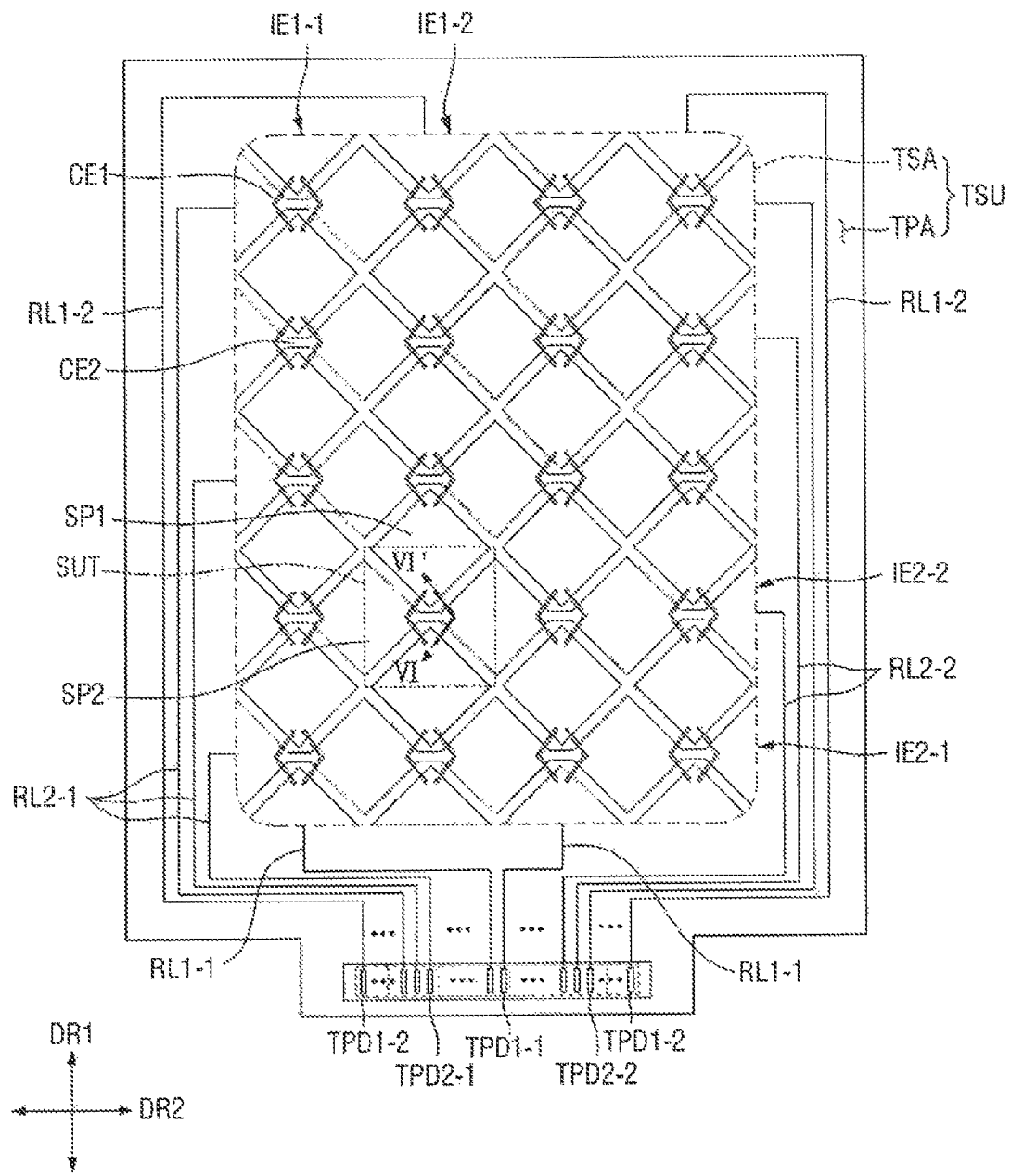
FIG. 3 is a plan view showing a layout of a touch sensing unit according to an embodiment of the disclosure.

FIG. 3 is a plan view showing a layout of a touch sensing unit according to an embodiment of the disclosure.

Referring to FIG. 3, the touch sensing unit TSU may include a touch sensor area TSA that senses a user's touch, and a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a plurality of first electrodes IE1: IE1-1 and and a plurality of second electrodes IE2: IE2-1 and IE2-2. In a first mode, one of the first electrodes IE1 and the second electrodes IE2 may be used as a driving electrode while the other one may be used as a sensing electrode. According to the embodiment, the first electrodes IE1 are used as the driving electrodes of the first mode while the second electrodes IE2 are used as the sensing electrodes of the first mode. In this embodiment, both the first electrodes IE1 and the second electrodes IE2 may be used as sensing electrodes in a second mode. A more detailed description thereon will be given later.

The plurality of first electrodes IE1 may be extended in the first direction DR1 and may be spaced apart from one another in the second direction DR2. Each of the first sensing electrodes IE1 may include a plurality of first sensor portions SP1 arranged in the first direction DR1 and first connecting portions CE1 electrically connecting between adjacent ones of the first sensor portions SP1. For example, one first connecting portion CE1 may connect adjacent first sensor portions SP1 to each other. Each of the first electrodes IE1 may have a form in which a number of first sensor portions SP1 are connected with one another.

The plurality of second electrodes IE2 may be extended in the second direction DR2 and may be spaced apart from one another in the first direction DR1. The second sensing electrodes IE2 may include a plurality of second sensor portions SP2 arranged in the second direction DR2 and the second connecting portions CE2 electrically connecting between adjacent ones of the second sensor portions SP2. For example, one second connecting portion CE2 may connect adjacent second sensor portions SP2 to each other. Each of the second electrodes IE2 may have a firm in which a number of second sensor portions SP2 are connected with one another.

The first sensor portions SP1 and the second sensor portions SP2 adjacent to each other may form a unit sensing area SUT of the first mode. For example, halves of two adjacent first sensor portions SP1 and halves of two adjacent second sensor portions SP2 may form a square or a rectangle, with respect to the intersection between the first electrodes IE1 and the second electrodes IE2. The area defined by the halves of the adjacent two first sensor portions SP1 and halves of the two adjacent second sensor portions SP2 may be a unit sensing area SUT of the first mode. The unit sensing area SUT of the first mode may vary in size such that, in another embodiment of the disclosure, the area defined by the entireties of the adjacent two first sensor portions SP1 and entireties of the two adjacent second sensor portions SP2 may be a unit sensing area SUT of the first mode.

Each unit sensing area SUT may be larger than the size of a pixel. For example, each unit sensing area SUT may have an area equal to the area occupied by a plurality of pixels. The length of a side of the unit sensing area SUT may be in the range of, but is not limited to, 4 mm to 5 mm.

A plurality of unit sensing areas SUT may be arranged in row and column directions. In each of the unit sensing areas SUT, the capacitance value between the adjacent first sensor portions SP1 and the second sensor portions SP2 is measured to determine whether or not a touch input by a part of the body is made, and if so, the position may be obtained as the coordinates of the touch input by the part of the body.

In addition, the plurality of first and second sensor portions SP1 and SP2 forming each of the first and second electrodes IE1 and IE2 may be connected as one within each of the first and second electrodes IE1 and IE2, to form electrode lines. Each of the electrode lines may include an inductance component therein, and can recognize whether a touch is made by an electronic pen based on the inductance component.

The sensing of a touch input by a part of a body and the sensing of an input by an electronic pen using the first and second electrodes IE1 and IE2 will be described later.

The first electrodes IE1 and the second electrodes IE2 are extended in different directions and cross each other. The first electrodes IE1 and the second electrodes IE2 are insulated from each other at their intersections. They can be reliably insulated from each other by disposing the insulating layer between the conductive layers. An example of a stack structure of the touch sensing unit TSU is illustrated in FIG. 4.

Figure 4:
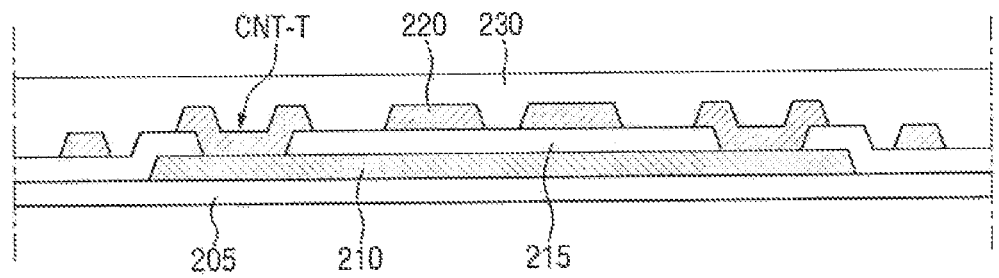
FIG. 4 is a cross-sectional view taken along line VI-VI' of FIG. 3.

FIG. 4 is a cross-sectional view taken along line VI-VI' of FIG. 3.

Referring to FIG. 4, the touch sensor unit TSU may include a base layer 205, a first touch conductive layer 210, a first touch insulating layer 215, a second touch conductive layer 220 and a second touch insulating layer 230. For example, the first touch conductive layer 210 is disposed on the base layer 205. The first touch conductive layer 210 is covered by the first touch insulating layer 215. The first touch insulating layer 215 insulates the first touch conductive layer 210 from the second touch conductive layer 220. The second touch conductive layer 220 is disposed on the first touch insulating layer 215, The second touch insulating layer 230 covers and protects the second touch conductive layer 220.

The base layer 205 may include an inorganic insulating material. The base layer 205 may be an inorganic film forming a thin-film encapsulation layer to be described later.

According to an embodiment of the disclosure, the first connecting portions CE1 may be formed of the first touch conductive layer 210, and the first sensor portions SP1, the second sensor portions SP2 and the second connecting portions CE2 may be formed of the second touch conductive layer 220, which is disposed above the first touch conductive layer 210 with the first touch insulating layer 215 therebetween. By virtue of such a configuration, the first electrodes IE1 and the second electrodes IE2 can be reliably insulated from each other at their intersection. It should be understood, however, that the disclosure is not limited thereto. The second connecting portions CE2 may be termed of the first touch conductive layer 210, while the first sensor portions SP1, the first connecting portions CE1 and the second sensor portions SP2 may be formed of the second touch conductive layer 220.

The first sensor portions SP1 of the first electrodes IE1 and the second sensor portions SP2 of the second electrodes IE2 may be formed in a planar pattern or a mesh pattern.

When the first sensor portions SP1 and the second sensor portions SP2 are formed in a mesh pattern, the first touch conductive layer 210 and the second touch conductive layer 220 may be made of a low-resistance material such as aluminum.

When the first sensor portions SP1 and the second sensor portions SP2 are formed in a planar pattern, if the first touch conductive layer 210 is made of a low-resistance material such as aluminum, the second touch conductive layer 220 forming the first sensor portions SP1 and the second sensor portions SP2 may be formed of a transparent conductive layer. Each of the transparent conductive layers may include a transparent conductive oxide such as indium tin oxide (ITO), indium zinc oxide (IZO), zinc oxide (ZnO) and indium tin zinc oxide (ITZO), a conductive polymer such as PEDOT, metal nanowire, graphene, etc.

In the following description, the first sensor portions SP1 and the second sensor portions SP2 are formed in a mesh pattern as an example.

The first touch insulating layer 215 and the second touch insulating layer 230 may include an inorganic insulating material or an organic insulating material. In an embodiment of the disclosure, the first touch insulating layer 215 or the second touch insulating layer 230 may include an inorganic material and the other may include an organic material.

The first touch insulating layer 215 may include a contact hole CNT_T. The first touch conductive layer 210 (e.g., the first connecting portions CE1) and a part of the second touch conductive layer 220 (e.g., the first sensor portions SP1) may be electrically connected to each other through the contact hole CNT_T.

Referring back to FIG. 3, the first electrodes IE1 and the second electrodes IE2 are at least partially connected to touch pad areas TPD via routing, lines RL1 and RL2 disposed in the touch peripheral area TPA, respectively. The first electrodes IE1 and the second electrodes IE2 may receive external signals via the routing lines RL1 and RL2. The routing lines RL1 and RL2 may be formed of the first touch conductive layer 210 and: or the second touch conductive layer 220 mentioned above with reference to FIG. 4. For example, the routing lines RL1 and RL2 may be formed of one of the first touch conductive layer 210 and the second touch conductive layer 220. In addition, to reduce line resistance, the routing lines RL1 and RL2 may be formed of a stack of the second touch conductive layer 220 directly on the first touch conductive layer 210, or may be formed in a structure in which they overlap each other and are connected with each other via a contact hole.

The first routing lines RL1: RL1-1 and RL1-2 may include (1-1) routing lines RL1-1 connected at the second ends of the first electrodes IE1 in the first direction DR1 (e.g., the ends closer to the touch pad areas TPD), and (1-2) routing lines RL1-2 connected at the first ends of the first electrodes IE1 in the first direction DR1 (e.g., the ends farther from the touch pad areas TPD). The first electrodes IE1 may be referred to as the (1-1) electrodes IE1-1 and the (1-2) electrodes IE1-2 depending on the type of the first routing lines RL1 connected thereto. The (1-1) electrodes IE1-1 are connected to the (1-1) routing lines RL1-1 at the second ends, and are not connected to the routing lines at the first ends. The (1-2) electrodes IE1-2 are connected to the (1-2) routing lines RL1-2 at the first ends, and are not connected to the routing lines at the second ends.

The (1-1) electrodes IE1-1 and the (1-2) electrode IE1-2 are alternately arranged in the second direction DR2. For example, in the row-and-column arrangement of the electrodes IE1 and IE2, the first sensor portions SP1 of the (1-1) electrodes IE1-1 may be arranged in odd-numbered columns, while the first sensor portions SP1 of the (1-2) electrodes IE1-2 may be arranged in even-numbered columns. It is to be understood that the (1-1) electrodes IE1-1 may be arranged in even-numbered columns while the (1-2) electrodes IE1-2 may be arranged in odd-numbered columns.

The (1-1) routing lines RL1-1 may be extended from the touch pad areas TPD toward the first side of the touch sensor area TSA in the first direction DR1 and may be connected directly to the second ends of the (1-1) electrodes IE1-1 in the first direction DR1. In other words, the (1-1) routing lines RL1-1 may not be extended around the entire outer side of the touch sensor area TSA but may be extended under the lower end of the touch sensor area TSA close to the touch pad areas TPD.

The (1-2) routing lines RL1-2 are extended around the entire outside of at least one side (e.g., the longer side in FIG. 3) of the touch sensor area TSA. In other words, the (1-2) routing lines RL1-2 may include a part extended along the outside of the longer side of the touch sensor area TSA. The (1-2) routing lines RL1-2 may be extended from the touch pad areas TPD toward the first side of the touch sensor area TSA in the first direction DR1, may be extended along the left/right edges (e.g., the longer sides) of the touch sensor area TSA, and ma be connected to the first ends of the (1-2) electrode IE1-2 at a second side of the touch sensor area TSA in the first direction DR1. Accordingly, the (1-2) routing lines RL1-2 may have a longer path than the (1-1) routing lines RL1-1. Since the (1-2) routing lines RL1-2 have a longer path than the (1-1) routing lines RL1-1, the length of the (1-2) routing lines RL1-2 may also be larger than the (1-1) routing lines RL1-1. It should be understood, however, that the disclosure is not limited thereto. To achieve a uniform line resistance, the relatively short (1-1) routing lines RL1-1 may be extended in a zigzag pattern so that the overall length may be substantially equal to that of the (1-2) routing lines RL1-2. In this case that the lines are extended in a zigzag pattern, a uniform line resistance can be achieved between the lines having paths of different lengths even in the same (1-1) routing lines RL1-1 or the (1-2) routing lines RL1-2.

The second routing lines RL2: RL2-1 and RL2-2 may include (2-1) routing lines RL2-1 connected at the first ends of the second. electrodes IE2 in the second direction DR2 (e.g., the left edge of the touch sensor area TSA), and (2-2) routing lines RL2-2 connected at the second ends of the second electrodes IE2 in the second direction DR2 (e.g., the right edge of the touch sensor area TSA). The second electrodes IE2 may be referred to as the (2-1) electrodes IE2-1 and the (2-2) electrodes IE2-2 depending on the type of the second routing lines RL2 connected thereto. The (2-1) electrodes IE2-1 are connected to the (2-1) muting lines RL2-1 at the first ends, and the (2-2) electrodes IE2-2 are connected to the (2-2) routing lines RL2-2 at the second ends.

The (2-1) electrodes IE2-1 and the (2-2) electrode IE2-2 are alternately arranged in the first direction DR1. For example, in the rows and columns of the electrodes IE1 and IE2, the second sensor portions SP2 of the (2-1) electrodes IE2-1 may be arranged in odd-numbered rows, while the second sensor portions SP2 of the (2-2) electrodes IE2-2 may be arranged in even-numbered rows. It is to be understood that the (2-1) electrodes IE2-1 may be arranged in even-numbered rows while the (2-2) electrodes IE2-2 may be arranged in odd-.numbered rows.

The (2-1) routing lines RL2-1 may be extended toward the left edge of the touch sensor area TSA, and may be connected to the first ends of the (2-1) electrode IE2-1 in the second direction DR2. The (2-2) routing lines RL2-2 may be extended toward the right edge of the touch sensor area TSA, and may be connected to the second ends of the (2-2) electrode IE2-2 in the second direction DR2.

The touch pad areas TPD may include a plurality of touch pad areas TPD: TPD1-1, TPD1-2, TPD2-1 and TPD2-2. Each of the plurality of touch pad areas TPD may include one or more touch pads.

The plurality of touch pad areas TPD may include a (1-1) touch pad area TPD1-1 to which the (1-1) routing lines RL1-1 are connected, a (1-2) touch pad area TPD1-2 to which the (1-2) routing lines RL1-2 are connected, a (2-1) touch pad area TPD2-1 to which the (2-1) routing lines RL2-1 are connected, and a (2-2) touch pad area TPD2-2 to which the (2-2) routing lines RL2-2 are connected. The plurality of touch pad areas TPD: TPD-1, TPD1-2, TPD2-1 and TPD2-2 may be arranged along the second direction DR2, and their positions may be related to the positions of the routing lines RL1 and RL2.

For example, a (1-2) touch pad area TPD1-2 may be disposed on the first side of the touch pad areas TPD in the second direction DR2, and the (2-1) touch pad area TPD2-1, the (1-1) touch pad area TPD1-1, the (2-2) touch pad area TPD2-2, and the (1-2) touch pad area TPD1-2 may be arranged therefrom toward the second side in the second direction DR2. For example, the (1-2) touch pad area TPD1-2, the (2-1) touch pad area TPD2-1, the (1-1) touch pad area TPD1-1, the (2-2) touch pad area TPD2-2, and the (1-2) touch pad area TPD1-2 may be arranged in sequence along the second direction DR2. The (1-2) touch pad area TPD1-2 may be disposed at the outermost position on the first side of the touch pad areas TPD in the second direction DR2, and the (1-2) touch pad area TPD1-2 may be disposed at the outermost position on the second side of the touch pad areas TPD in the second direction DR2.

According to an embodiment of the disclosure a touch member includes: a first electrode (IE1-1, IE1 disposed in a touch sensor area TSA and extending in a first direction DR1; a second electrode (IE2-1, IE2-2) disposed in the touch sensor area TSA and extending in a second direction DR2 crossing the first direction DR1; touch pad areas TPD located in a touch peripheral area TPA around the touch sensor area ISA; and routing lines RL located in the touch peripheral TPA area to connect the first electrode and the second electrode with the touch pad areas, wherein the routing lines include a (1-1) routing line RL1-1, a (1-2) routing line RL1-2, a (2-1) routing line RL2-1, and a (2-2) routing line RL2-2, the first electrode includes a (1-1) electrode IE1-1 having a first end not connected to the routing lines and a second end connected to the (1-1) routing line RL1-1, and a (1-2) electrode IE1-2 having a first end connected to the (1-2) routing line RL1-2 and a second end not connected to the routing lines, the second electrode includes a (2-1) electrode IE2-1 having a first end connected to the (2-1) routing line RL2-1 and a second end not connected to the routing lines, and a (2-2) electrode IE2-2 having a first end not connected to the routing lines and a second end connected to the (2-2) routing line RL2-2, the (1-1) electrode IE1-1 and the (1-2) electrode IE1-2 are alternately arranged in the second direction DR2, and the (2-2) electrode IE2-1 and the (2-2) electrode IE2-2 are alternately arranged in the first direction DR1.

As described above, according to the embodiment, the routing lines RL1 and RL2 are connected to only one of the first and second ends of the electrodes IE1 and IE2, while the other ends of the electrodes IE1 and IE2 are not connected to the routing lines RL1 and RL2 but are open. The different connection structures of the routing lines RL1 and RL2 are also alternately arranged along the first direction DR1 and the second direction DR2. Such a structure in which the ends of the electrodes IE1 and IE2 are connected to the routing lines RL1 and RL2 is appropriate for performing operations necessary for the first mode in which a first-mode driving signal is supplied through the routing lines RL1 and RL2 and a first-mode sensing signal is received. In addition, as will be described in more detail later, as one side of each of the electrodes IE1 and IE2 is open, electronic pen sensing in the second mode is also possible. In addition, the different connection structures of the routing lines RL1 and RL2 help to increase the recognition accuracy of the touch by the electronic pen at various positions in the second mode. A more detailed description thereon will be given later with reference to FIG. 7.

As such, the display device 1 can sense an input by the electronic pen 30 through the touch sensing unit TSU that senses a touch by a part of a user's body 20. Therefore, the display device 1 can recognize an input by the electronic pen 30 as well as the contact touch input by a part of the user's body 20 through a single sensor layer, so that the thickness of the display device 1 can be reduced and the cost thereof can be saved.

Hereinafter, a planar arrangement and a cross-sectional structure of a pixel and a touch sensing unit will be described.

Figure 5:
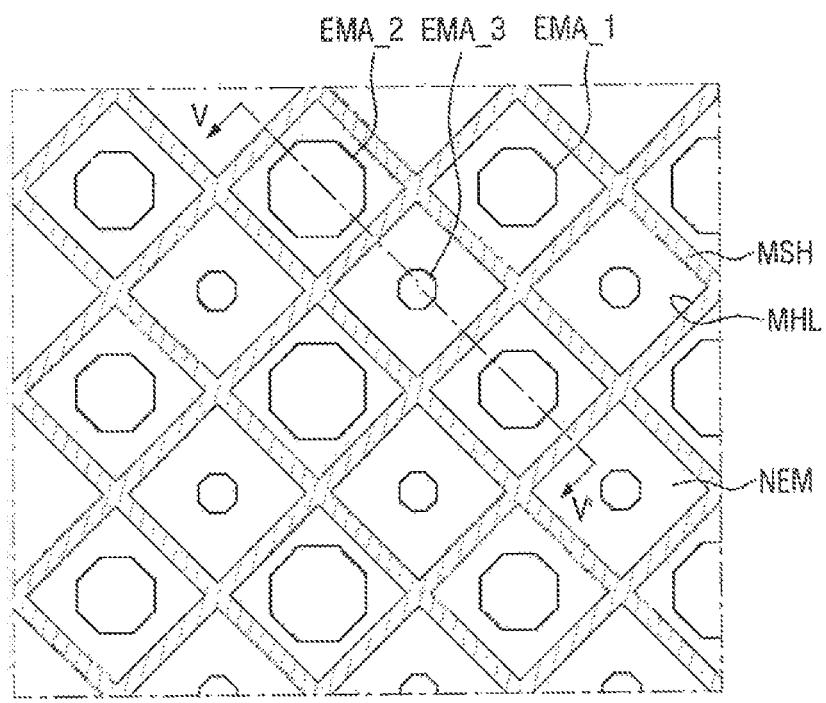
FIG. 5 is a diagram showing the arrangement relationship between pixels of a display unit and a mesh pattern of a touch sensing unit according to an embodiment of the disclosure.
Figure 6:
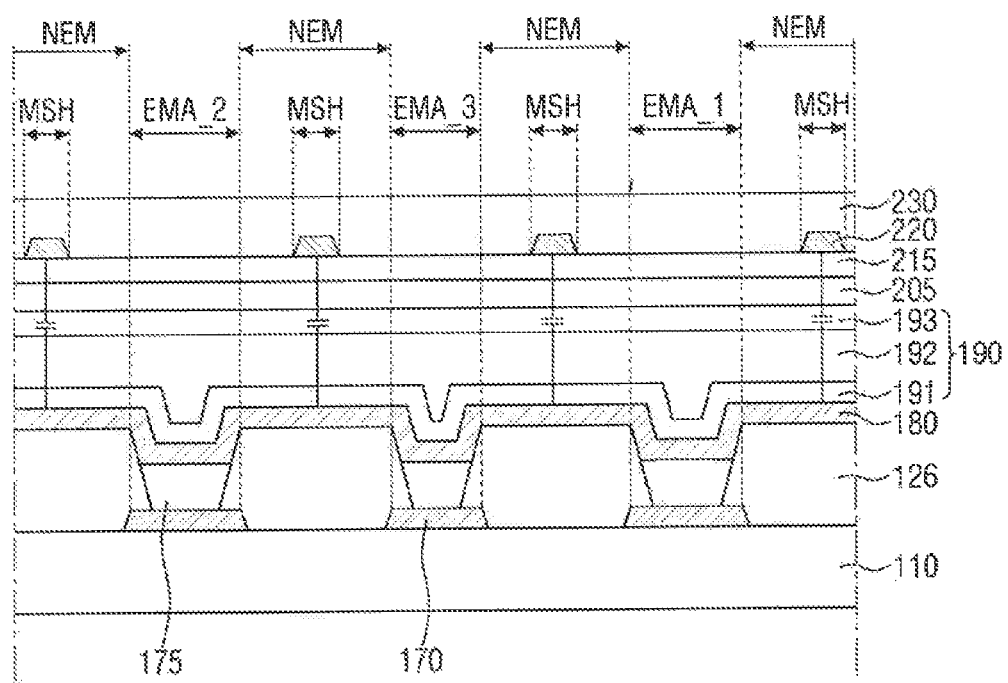
FIG. 6 is a cross-sectional view taken along line V-V' of FIG. 5.

FIG, 5 is a diagram showing the arrangement relationship between pixels of a display unit and a mesh pattern of a touch sensing unit according to an embodiment of the disclosure, FIG. 6 is a cross-sectional view taken along line V-V' of FIG. 5. In the cross-sectional view of FIG. 6. most of the layers under an anode electrode are not depicted and the structure above an organic light-emitting element is mainly shown.

First, referring to FIG. 5, the display unit includes a plurality of pixels. Each of the pixels includes an emission area EMA. A non-emission area NEM is disposed between the emission area EMA of a pixel and the emission area EMA of another pixel. A mesh pattern MSH is disposed in the non-emission area NEM.

The pixels may include a first color pixel, a second color pixel, and a third color pixel. The color pixels may be arranged in a variety of ways. According to an embodiment of the disclosure, first color pixels EMA_1 and second color pixels EMA_2 may be alternately arranged in the second direction DR2 to form a first row, while third color pixels EMA_3 may be arranged in the second direction DR2 to form a second row next to the first row. The pixels belonging to the second row may be arranged in a staggered manner in the second direction DR2 with respect to the pixels belonging to the first row. The arrangement of the first and second rows may be repeated along the second direction DR2.

The sizes of the emission areas EMA in the color pixels may be different, and the shapes of the emission areas EMA may be variously formed but may be generally octagonal.

The mesh pattern MSH may be disposed along the boundary of the pixel in the non-emission area NEM. The mesh pattern MSH may not overlap the emission area EMA. The width of the mesh pattern MSH may be smaller than the width of the non-emission area NEM. Mesh holes MHL may have the same size. Alternatively, the mesh holes MHL may have different sizes either depending on the size of the emission areas EMA exposed via the mesh holes MHL or regardless of the size of the emission areas EMA exposed via the mesh holes MHL.

Referring to FIG. 6, an anode electrode 170 is disposed on a substrate 110 in every pixel. A pixel-defining film 126 exposing the anode electrode 170 is disposed on the anode electrode 170. The pixel-defining film 126 is disposed in the non-emission area NEM.

An organic layer 175 is disposed on the anode electrode 170 exposed by the pixel-defining film 126, and a cathode electrode 180 is disposed thereon. The cathode electrode 180 may be disposed across the pixels. The anode electrode 170, the organic layer 175 and the cathode electrode 180 form an organic light-emitting element.

The anode electrode 170 may receive a first supply voltage ELVDD through a thin-film transistor, and the cathode electrode 180 may receive a second supply voltage ELVSS. The organic light-emitting element may emit light in response to a driving current corresponding to the data signal applied to the thin-film transistor.

A thin-film encapsulation layer 190 including a first inorganic film 191 an organic film 192, and a second inorganic film 193 is disposed on the cathode electrode 180. On the thin-film encapsulation layer 190, the base layer 205 of the touch sensing unit TSU, the first touch insulating layer 215, the second touch conductive layer 220 and the second touch insulating layer 230 may be sequentially disposed.

The second touch conductive layer 220 may overlap the pixel-defining, film 126 and may be disposed in the non-emission area NEM. The second touch conductive layer 220 forms the mesh pattern MSH of the sensor portions (e.g., SP1 and SP2) and does not interfere with emission of light and is not seen by a viewer because it does not overlap the emission area EMA.

A capacitor may be formed between the above-described cathode electrode 180 and the second touch conductive layer 220. In other words, the capacitor includes the cathode electrode 180 and the second touch conductive layer 220 facing it. An insulating material such as the thin-film encapsulation layer 190, the base layer 205 and the first touch insulating layer 215 interposed between the electrodes facing each other may work as a dielectric layer of the capacitor. Such a capacitor may be referred to as capacitors C1, C2 . . . Cn (see FIG. 13) of the first sensor portions SP1 (see FIG. 13) on the equivalent circuit diagram shown in FIGS. 13 and 14 to be described later.

Figure 7:
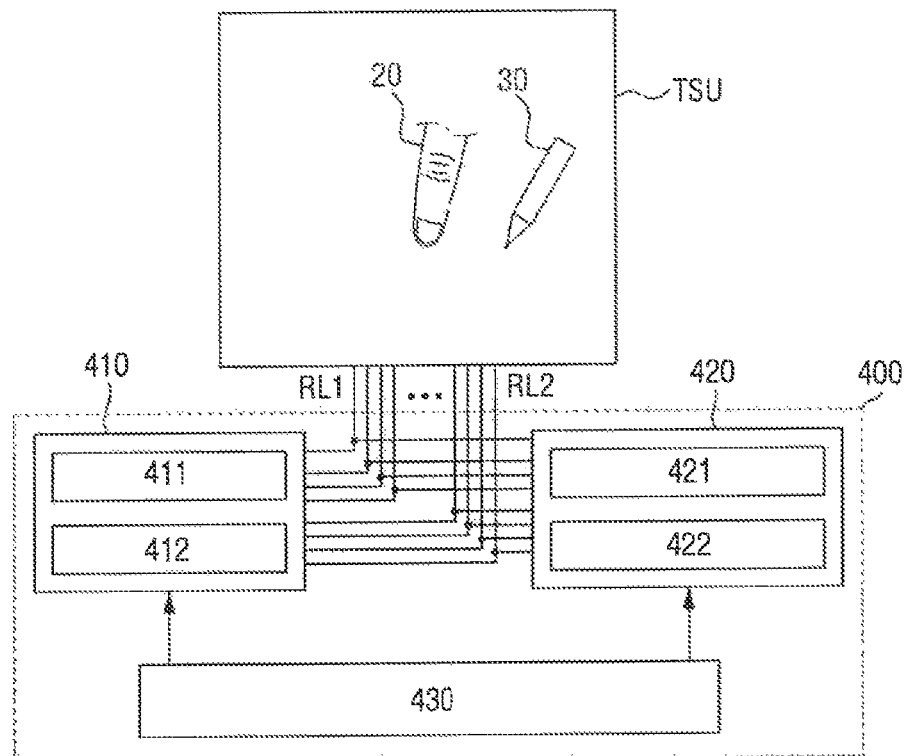
FIG. 7 is a block diagram schematically showing a touch driving circuit of a display device according to an embodiment of the disclosure.

FIG. 7 is a block diagram schematically showing a touch driving circuit of a display device according to an embodiment of the disclosure.

Referring to FIG. 7, the touch sensing unit TSU may sense a touch by a part 20 of a user's body through a plurality of electrodes IE1 and IE2 in the first mode, and may sense proximity or contact by the electronic pen 30 through a plurality of electrodes IE1 and IE2 in the second mode. The touch driving circuit 400 senses if there is a touch at the touch sensing unit TSU using sensing signals or pen signals received from the touch sensing unit TSU. In other words, the first mode may be a body input, sensing mode, and the second mode may be an electronic pen input sensing mode.

The touch driving circuit 400 may include a first touch driving circuit 410 configured to recognize a touch by the part 20 of the user's body (e.g., a finger) in the first mode, and a second touch driving circuit 420 configured to recognize a touch by the electronic pen 30 in the second mode.

The first touch driving circuit 410 may include a first driving signal supplying unit 411 for transferring a first mode driving signal to the first electrodes IE1 through a plurality of first routing lines RL1, and a first sensing signal receiving unit 412 for receiving the first mode sensing; signal of the second electrodes IE2 through the plurality of second routing lines RL2.

The second touch driving circuit 420 may include a second driving signal supplying unit 421 for transferring a second-mode driving signal to the first and second electrodes IE1 and IE2 through the first and second routing lines RL1 and a second sensing signal receiving unit 422 for receiving the second mode sensing signal from the first and second electrodes IE1 and IE2. The first and second routing lines RL1 and RL2 connected to the second touch driving circuit 420 may at least partially share the plurality of first routing lines RL1 and the plurality of second routing lines RL2 connected to the first touch driving circuit 410.

The touch driving circuit 400 may further include a touch controller 430 to distinguish the first mode from the second mode. The touch controller 430 can control the operations of the first and second touch driving circuits 410 and 420, and can determine if there is a touch by the part 20 of the user's body or the electronic pen 30 and the position if so based on the sensed data output from the first and second touch driving circuits 410 and 420. For example, the touch controller 430 may apply a first control signal to the first touch driving circuit 410 to operate in the first mode, and may apply a second control signal to the second touch driving circuit 420 to operate in the second mode. The touch mode may include sensing modes operated at different timings (see FIG. 23).

Figure 8:
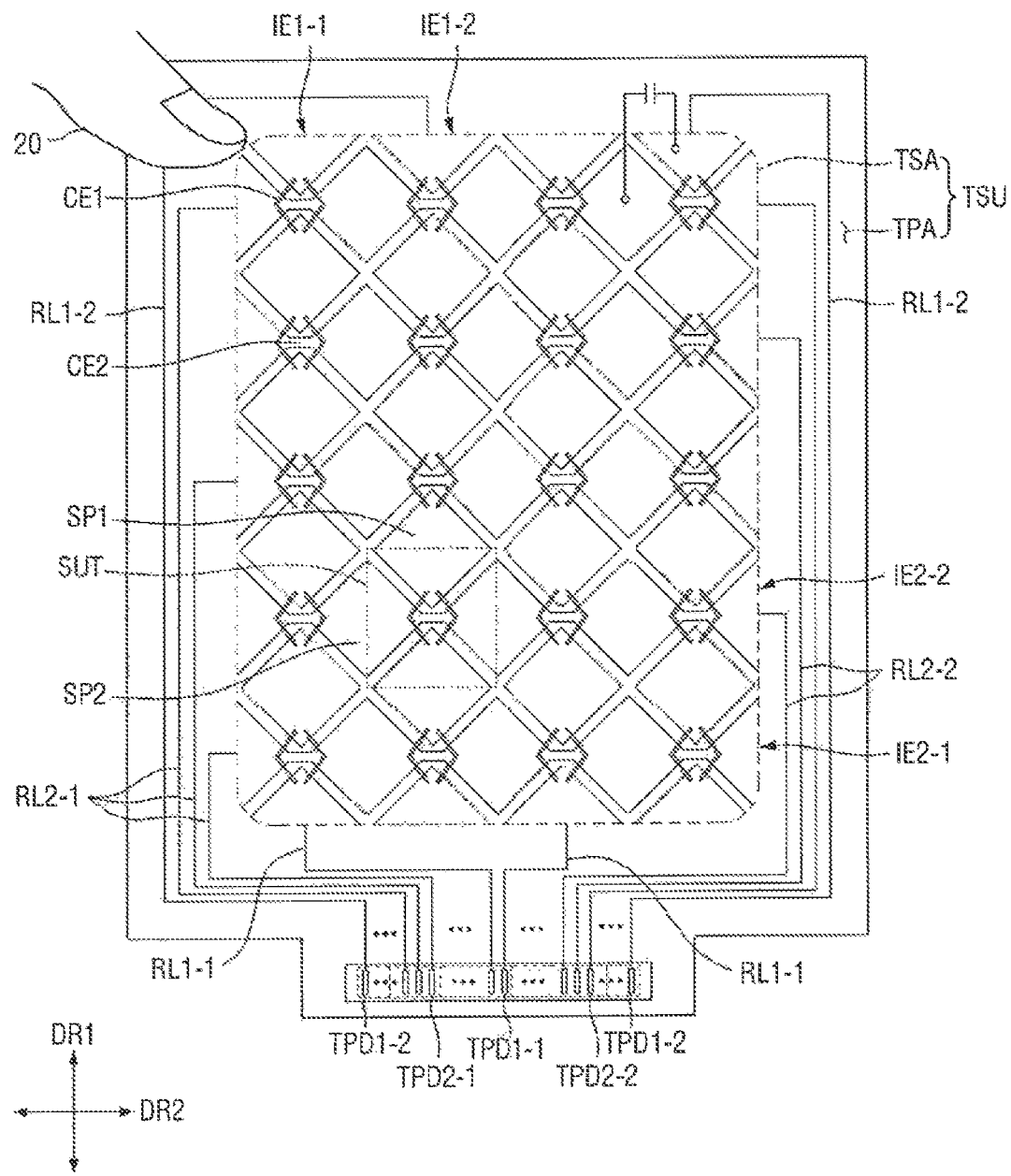
FIG. 8 is a diagram schematically showing a touch input by a part of a body being sensed by a touch sensing unit in a first mode according to an embodiment of the disclosure.
Figure 9:
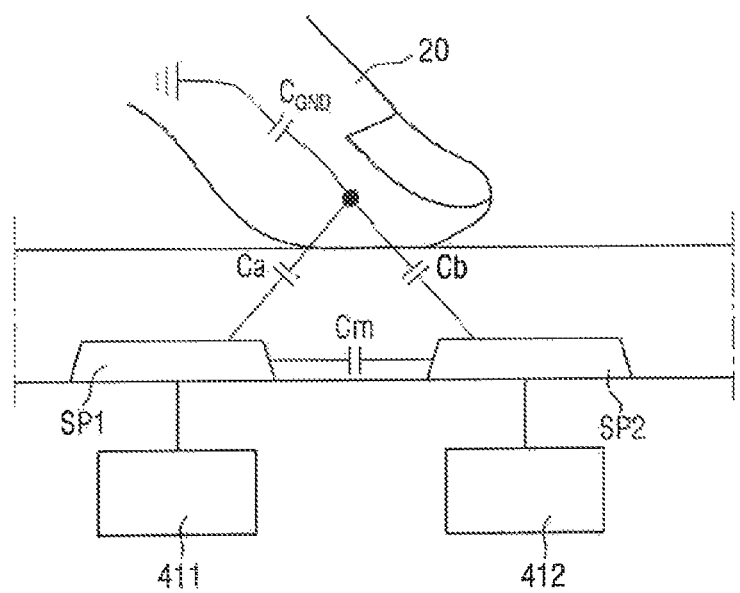
FIG. 9 is a diagram schematically illustrating a touch input by a part of the body being sensed by the touch sensing unit according to an embodiment of the disclosure.

FIG. 8 is a diagram schematically showing a touch input by a part of a body being sensed by a touch sensing unit in a first mode according to an embodiment of the disclosure. FIG. 9 is a diagram schematically illustrating a touch input by a part of the body being sensed by the touch sensing unit according to the embodiment.

Referring to FIGS. 8 and 9, when a part of the body 20 touches the unit sensing area SUT of the touch sensing unit TSU, the first mode may be set. In the first mode, the first driving signal supplying unit 411 may sequentially supply the driving signal to the first sensor portions SP1 of the first electrodes IE1. The first sensing signal receiving unit 412 may sense the amount of change in the mutual capacitance Cm sensed through the second sensor portions SP2 of the second electrodes IE2. As shown in FIG. 9, the mutual capacitance Cm may change the coupling capacitance Ca or Cb between the part of the body 20 and the first sensor portion SP1 and/or the second sensor portion SP2. Accordingly, the first touch driving circuit 410 can determine if there is a touch by the part of the body 20 and can calculate coordinates of the touched unit sensing area SUT if so touched. Although the touch by the part of the body 20 is recognized by mutual capacitance sensing in the above example, the touch may be recognized by self-capacitance sensing as well.

Figure 10:
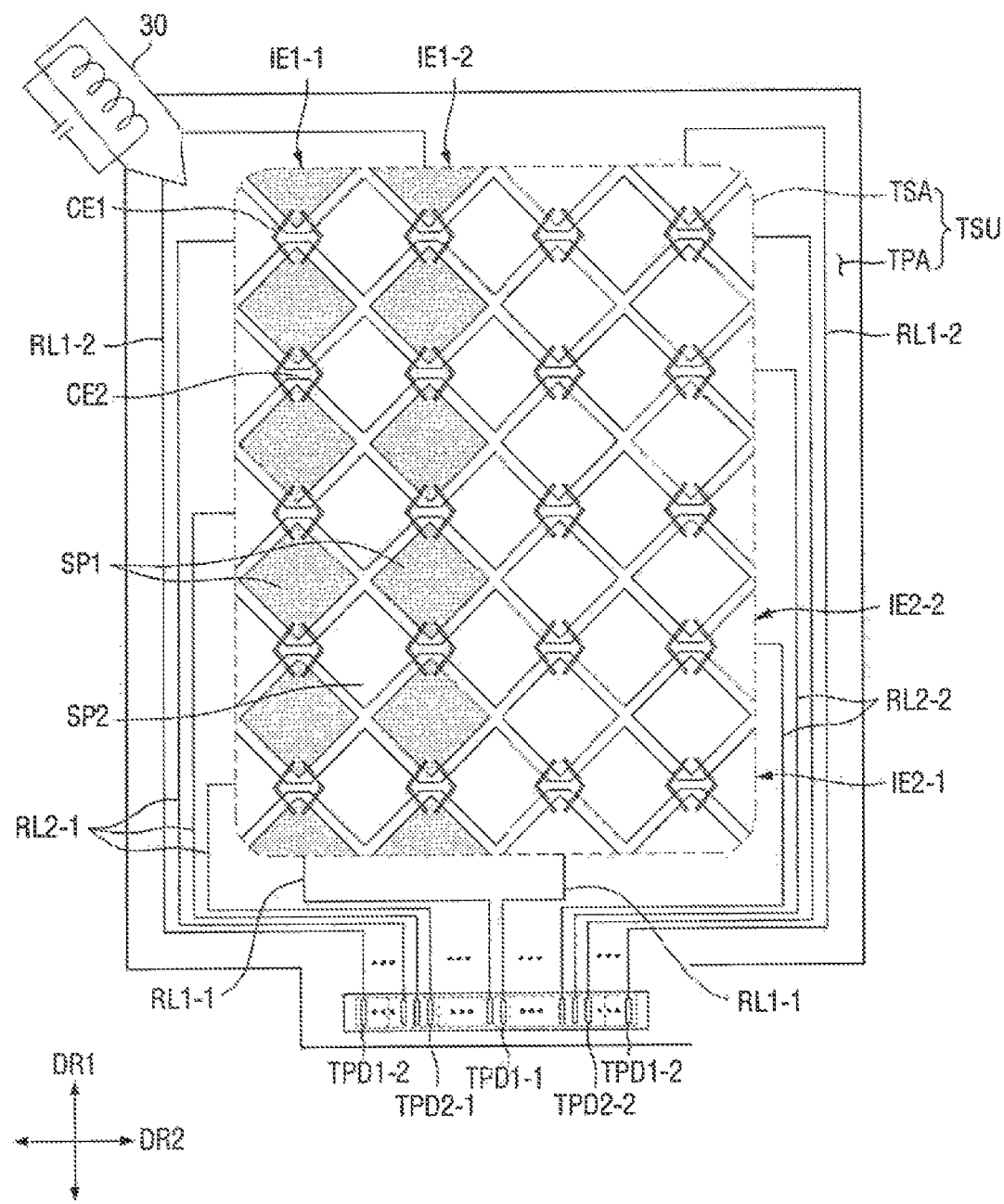
FIG. 10 is a diagram schematically showing a touch input h an electronic pen being sensed by a touch sensing unit in a second mode according to an embodiment of the disclosure.
Figure 11:
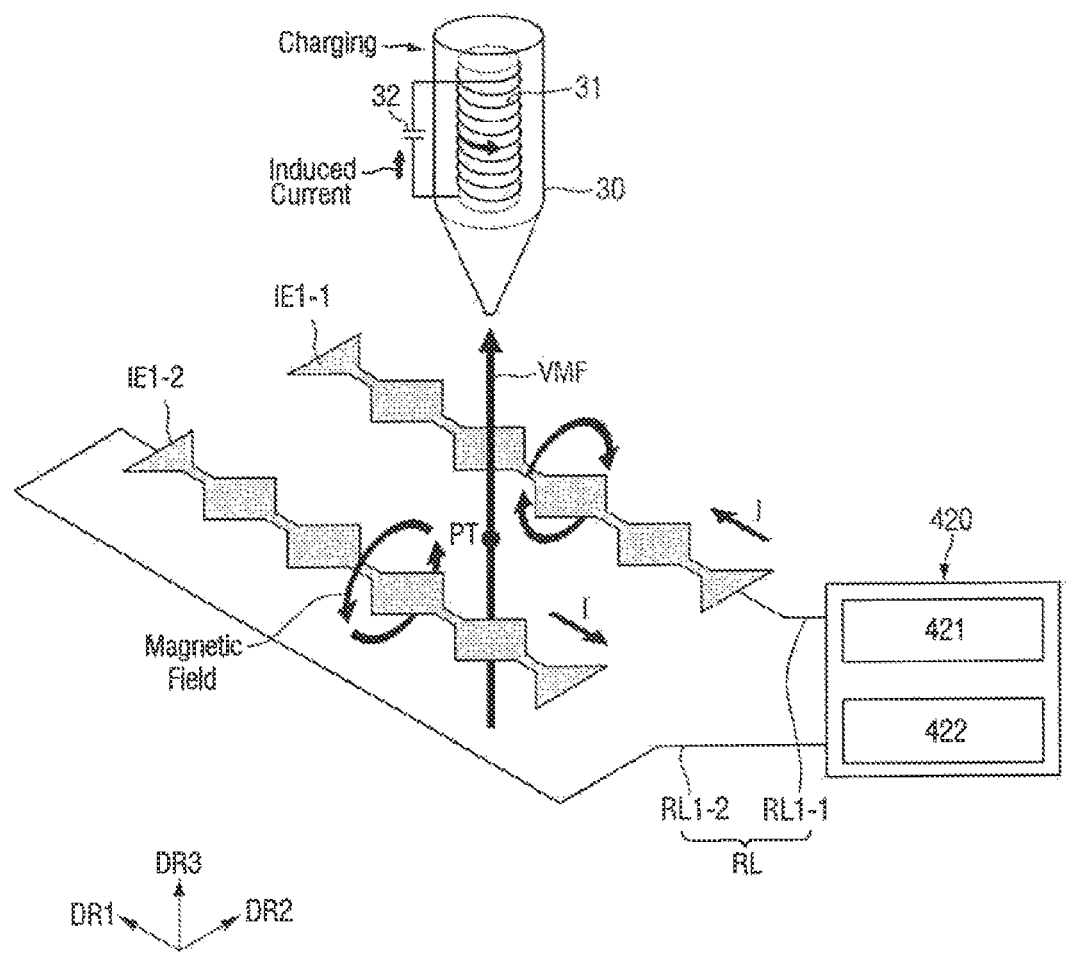
FIG. 11 is a diagram schematically illustrating a touch driving process by an electronic pen and a charging of an electronic pen in a display device according to an embodiment of the disclosure.
Figure 12:
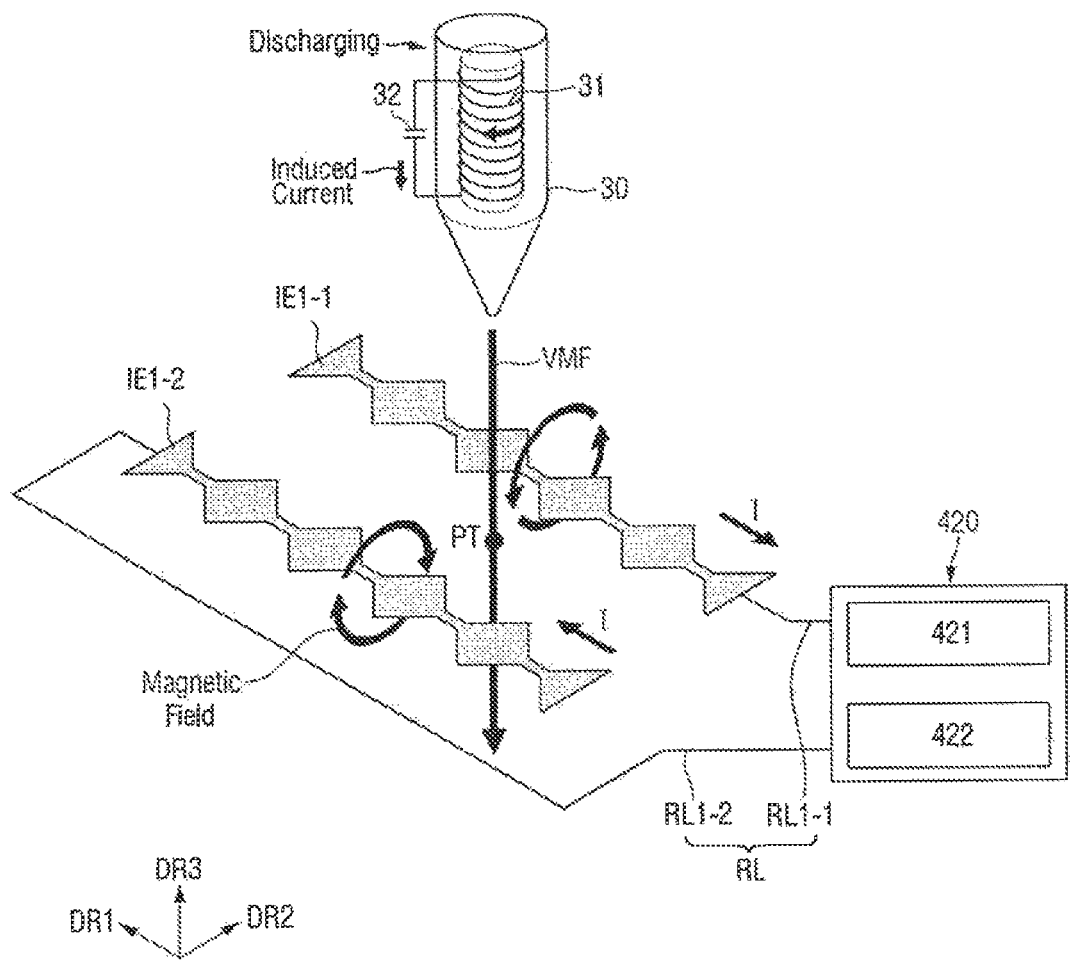
FIG. 12 is a diagram schematically illustrating a touch sensing process by an electronic pen and a discharging of an electronic pen in a display device according to an embodiment of the disclosure.

FIG. 10 is a diagram schematically showing a touch input by an electronic pen being sensed by a touch sensing unit in a second mode according to an embodiment of the disclosure. FIG. 11 is a diagram schematically illustrating a touch driving process by an electronic pen and a charging of an electronic pen in a display device according to an embodiment of the disclosure. FIG. 12 is a diagram schematically illustrating, a touch sensing process by an electronic pen and a discharging of an electronic pen in a display device according to an embodiment of the disclosure.

As shown in FIG. 10, when an electronic pen 30 is proximate, the second mode may be set to sense the proximity of the electronic pen 30. The sensing of the electronic pen 30 may include a charging step and a discharging step using electromagnetic resonance. Charging and discharging of the electronic pen 30 may be performed by the second touch driving circuit 420.

Referring. to FIG. 11, a charging step using electromagnetic resonance (EMR) in the second mode will be described.

The second driving signal supplying unit 421 may supply the second-mode driving signal to the plurality of first electrodes IE1 for charging, the electronic pen 30 in the charging step of the second mode. The second-mode driving signal may be a signal having driving pulses. The second-mode driving signal may be, but is not limited to, a sine wave or a pulse wave having a predetermined frequency. The frequency of the second-mode driving signal may correspond to the LC resonance frequency of the electronic pen 30. The frequency of the second-mode driving signal may be equal to the resonance frequency of the electronic pen 30, but the disclosure is not limited thereto. The electronic pen 30 may include a coil 31 and a capacitor 32, and the LC resonance frequency of the electronic pen 30 may be determined based on the capacitance of the capacitor 32 and the inductance of the coil 31.

The second driving signal supplying unit 421 may supply the second-mode driving signals having opposite phases to the (1-1) electrodes IE1-1 connected to the (1-1) routing lines RL1-1 and the (1-2) electrodes IE1-2 connected to the (1-2) routing lines RL1-2.

In the second mode, the first electrodes IE1 and the second electrodes IE2 operate in substantially the same manner, and thus the manner in which the first electrode IE1 operates will be described as an example. The (1-1) electrode IE1-1 and the (1-2) electrode IE1-2 are alternately arranged, and one of the (1-1) electrodes IE1-1 and the (1-2) electrodes IE1-2 is disposed on one side of a particular point PT where the electronic pen 30 is positioned, and the other one thereof may be disposed on the opposite side of the particular point PT.

When the (1-1) electrode IE1-1 is disposed on one side of the particular point PT while the (1-2) electrode IE1-2 is disposed on the opposite side of the particular point PT, an electric current flows in the (1-1) electrode IE1-1 toward the first side in the first direction DR1 so that a clockwise magnetic field may be generated, while an electric current flows in the (1-2) electrode IE1-2 toward the second side in the first direction DR1 so that a counterclockwise magnetic field may be generated. At the particular point PT, the magnetic field by the (1-1) electrode IE1-1 and the magnetic field by the (1-2) electrode IE1-2 overlap each other, so that a magnetic field VMF may be generated which is directed toward one side in the third direction DR3 (e.g., the thickness direction).

The coil 31 of the electronic pen 30 may receive the magnetic field VMF induced by the touch sensing unit TSU toward one side of the third direction DR3 to generate an induced current. The induced current flowing through the electronic pen 30 may charge the capacitor 32 of the electronic pen 30. An electromotive force (EMF) of the capacitor 32 may increase during the charging period.

Referring to FIG. 12, the electronic pen 30 may be discharged in the discharging step of the second mode. The second sensing signal receiving unit 422 may sense the position of the electronic pen 30 by receiving a signal generated during the discharge period of the electronic pen 30.

For example, as the capacitor 32 of the electronic pen 30 is discharged, an electric current in the opposite direction to the induced current used during charging may flow in the coil 31 of the electronic pen 30. As a result, the magnetic field VMF may be generated toward the second side of the particular point PT in the third direction DR3. An induced current may flow toward the second side in the first direction DR1 in the (1-1) electrode IE1-1 adjacent to the generated magnetic field VMF, and an induced current may flow toward the first side in the first direction DR1 in the (1-2) electrode IE1-2. in other words, the (1-1) electrode IE1-1 and the (1-2) electrode IE1-2 may generate second-mode sensing signals in the opposite phase, and these signals may be transferred to the second sensing signal receiving unit 422 through the (1-1) routing line RL1-1 and the (1-2) routing, line RL1-2.

The operation timing of the charging and discharging steps of the second driving signal supplying unit 421 and the second sensing signal receiving unit 422 may be controlled by the touch controller 430 of FIG. 7.

As described above, the second driving signal supplying unit 421 may supply the second-mode driving signals in the opposite phase to the (1-1) electrodes IE1-1 and (1-2) electrodes IE1-2 disposed on both sides of the particular point PT to generate the magnetic field VMF directed toward the first side (or the second side) of the third direction DR3 so that the electronic pen 30 can be charged. The second sensing signal receiving unit 422 may receive the second-mode sensing signal induced based on the magnetic field VMF directed toward the second side (or the first side) of the third direction DR3 by the discharging of the electronic pen 30 to determine whether there is a touch by the electronic pen 30 and measure the coordinate value of the first coordinate axis.

Incidentally, in the display device 1, the different connection structures of the routing lines RL1 and RL2 increase the recognition accuracy of the touch by the electronic pen 30 at various positions in the second mode. A more detailed description thereon will be given with reference to FIGS. 13 and 14.

Figure 13:
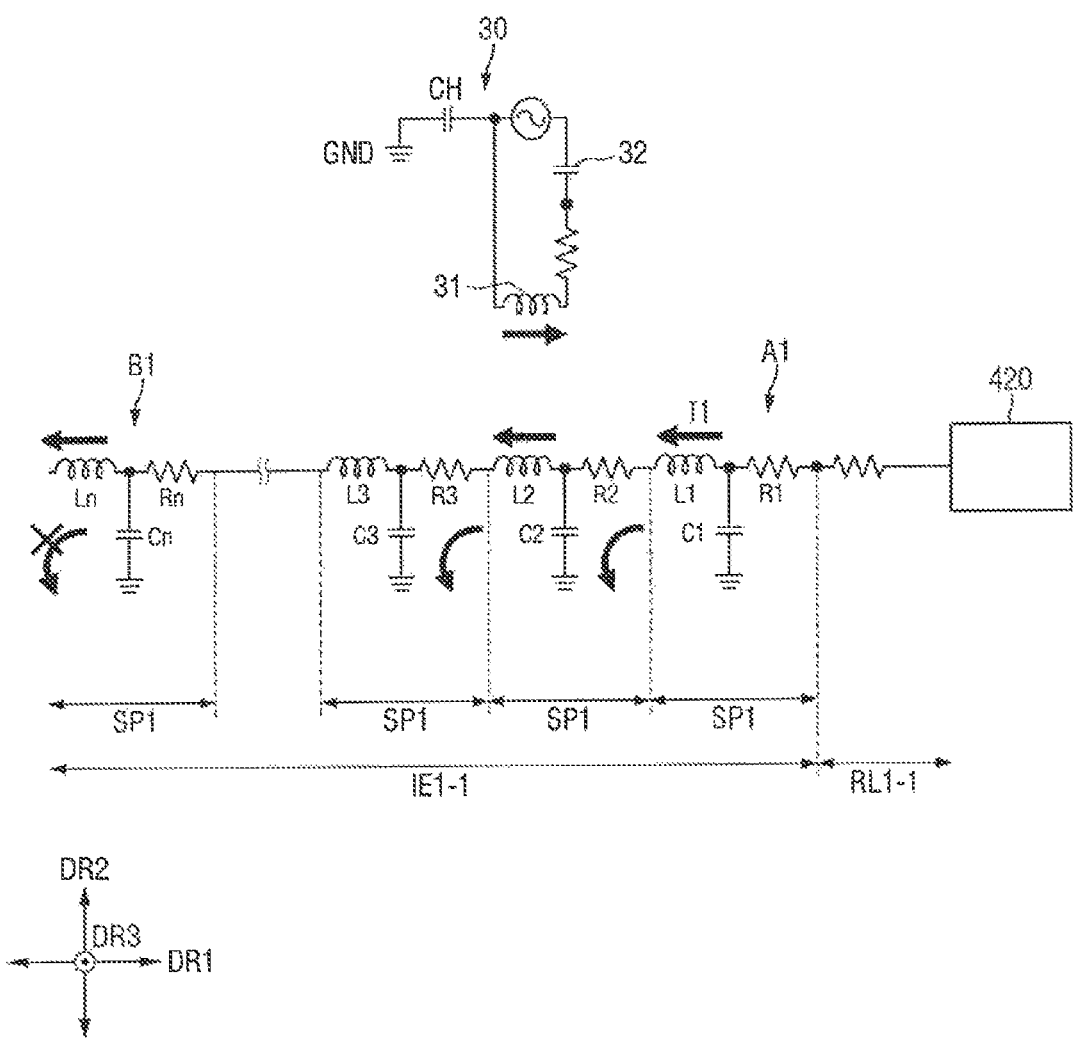
FIG. 13 is an equivalent circuit diagram in a second mode of a touch sensing, unit in a display device according to an embodiment of the disclosure.
Figure 14:
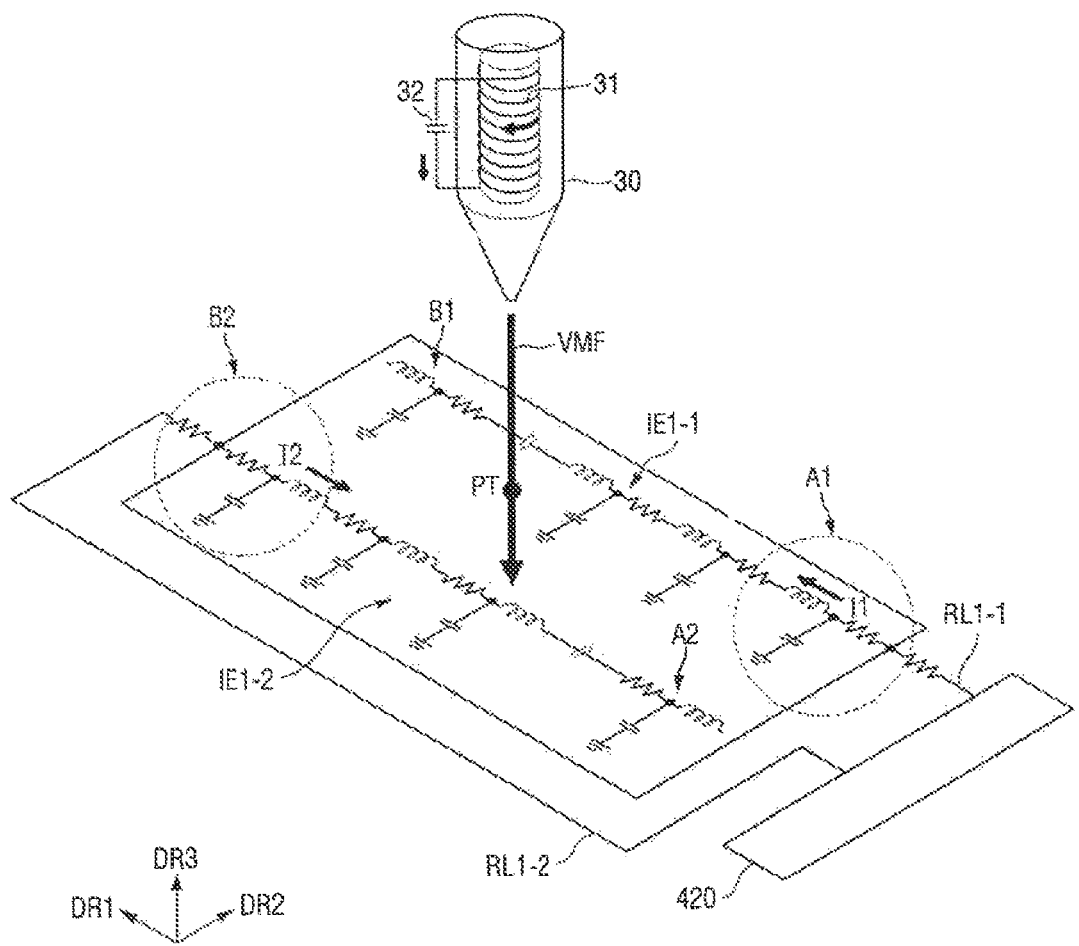
FIG. 14 is a diagram schematically showing the equivalent circuit diagram of FIG. 13 from the perspective of the touch sensing unit.

FIG. 13 is an equivalent circuit diagram in a second mode of a touch sensing unit in a display device according to an embodiment of the disclosure. FIG. 14 is a diagram schematically showing the equivalent circuit diagram of FIG. 13 from the perspective of the touch sensing unit. Although the touch sensing unit TSU includes a plurality of (1-1) electrodes IE1-1 and a plurality of (1-2) electrodes IE1-2, only one (1-1) electrode IE1-1 and only one (1-2) electrode IE1-2 are depicted in FIGS. 13 and 14.

First, a case in which the electronic pen 30 in proximity to the display device 1 generates an induced current in the first electrode IE1 will be described with reference to the equivalent circuit diagram of FIG. 13.

The plurality of first sensor portions SP1 forming the (1-1) electrode IE1-1 may be connected as one in the (1-1) electrode IE1-1 to form an electrode line. The first sensor portions SP1 may include intrinsic resistances $R1, R2 \ldots Rn$ and inductance components $L1, L2, \ldots Ln$, respectively. In addition, as described above, the first sensor portions SP1 may form capacitors $C1, C2 \ldots Cn$, respectively, between the display unit DU and themselves.

As the capacitor 32 of the electronic pen 30 is discharged, an electric current flows in the coil 31, and the magnetic field VMF may be radiated by LC resonance between the capacitor 32 and the coil 31. An induced voltage and an induced current I1 may be generated inside the electrode line including the plurality of first sensor portions SP1 by the magnetic field VMF. The capacitors $C1, C2 \ldots Cn$ hold the potential of the first sensor portions SP1.

Referring to FIGS. 13 and 14, the plurality of first sensor portions SP1 are interconnected to form a single electrode line. As described above, one electrode line has the intrinsic resistance R and inductance L, can form a capacitance C, and an induced voltage can be generated in the electrode line by the above elements.

One end A1 of the (1-1) electrode IE1-1 close to the second touch driving circuit 420 is connected to the (1-1) routing line RL1-1, and the other end B1 of the (1-1) electrode IE1-1 far from the second touch driving circuit 420 is open, and thus the electrode line does not form a closed loop. The other end B1 of the (1-1) electrode IE1-1 may be the distal end farthest from the second touch driving circuit 420. The end A1 may be referred to as a first end of the (1-1) electrode IE1-1, and the end B1 may be referred to as a second end of the (1-1) electrode IE1-1.

When the induced current I1 is generated in the (1-1) electrode IE1-1 due to the proximity of the electronic pen 30, the induced current I1 flows from the end A1 close to the second touch driving circuit 420 to the other end B1. In this case, since the (1-1) electrode IE1-1 does not form a closed loop, it is not possible to form a path through which the induced current I1 flows at the other end B1 far from the second touch driving circuit 420, and thus the potential may not be held. Accordingly, the sensing sensitivity may be decreased at the other end B1, which is the distal end of the (1-1) electrode IE1-1, compared to that of the end A1.

One end B2 of the (1-2) electrode IE1-2 far from the second touch driving circuit 420 is connected to the (1-2) routing line RL1-2, and the other end A2 of the (1-2) electrode IE1-2 close to the second touch driving circuit 420 is open, and thus the electrode line does not form a closed loop. In other words, since the end A2 of the (1-2) electrode IE1-2 is farthest from the (1-2) routing RL1-2, the potential may not be held to the end A2. The end A2 may be referred to as a first end of the (1-2) electrode IE1-2, and the second B2 may be referred to as a second end of the (1-2) electrode IE1-2.

Rather, since the (1-2) routing line RL1-2 is connected to the end 132 of the (1-2) electrode IE1-2, it may be relatively easy to provide the path of the induced current I2 at the position far from the second touch driving circuit 420. in other words, when the particular point PT of the electronic pen 30 is far from the second touch driving circuit 420, the sensing sensitivity of the first-second electrode IE1-2 increases, so that it is easy to sense the accurate position.

Accordingly, the display device 1 can have high sensing sensitivity not only when the electronic pen 30 is located close to the second touch driving circuit 420 but also when it is located far from it, and thus, it is possible to sense the electronic pen 30 precisely at any position.

For example, when the particular point PT of the electronic pen 30 is close to the second touch driving circuit 420, the position coordinates can be calculated using the sensing signal value measured by the (1-1) electrode IE1-1 routed close thereto. When the particular point PT of the electronic pen 30 is far from the second touch driving circuit 420, the position coordinates can be calculated using the sensing signal value measured by the (1-2) electrode IE1-2 routed far therefrom. Accordingly, regardless of the position of the electronic pen 30, it is possible to always measure with a high value of the sensing sensitivity, and thus, it is possible to calculate accurate position coordinates.

A method of determining coordinates based on recognized signals in a display device according to an embodiment of the disclosure will be described with reference to FIGS. 15 to 21.

Figure 15:
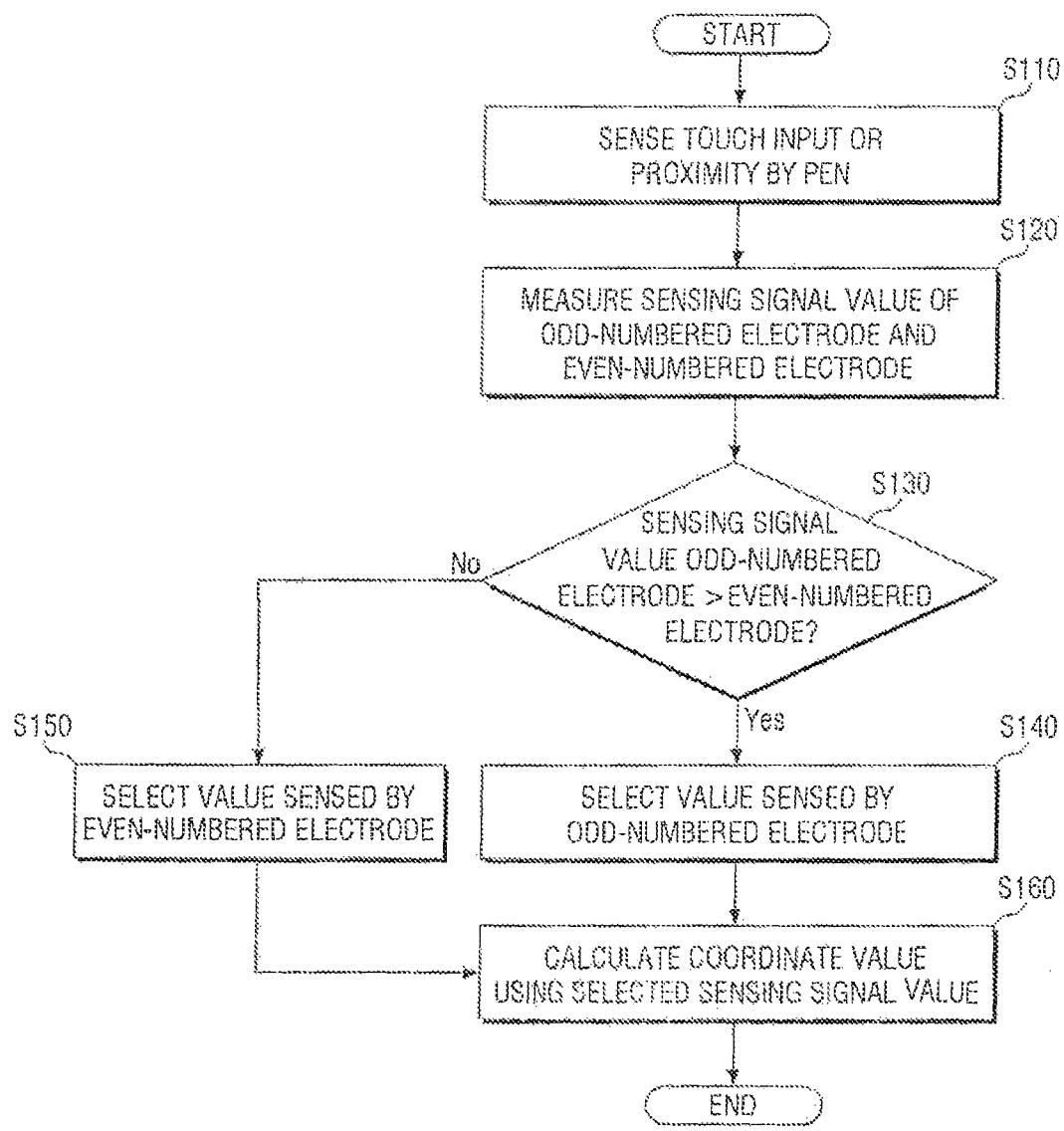
FIG. 15 is a flowchart for illustrating a driving process in a second mode according to an embodiment of the disclosure.

FIG. 15 is a flowchart illustrating a method of determining coordinates of an electronic pen in a second mode of a display device according to an embodiment of the disclosure.

Referring to FIG. 15, it is determined whether a touch input or proximity by an electronic pen 30 is sensed (step S110). The touch input by the electronic pen 30 may be sensed by the second touch driving circuit 420.

When the electronic. pen 30 is proximate thereto, the second touch driving circuit 420 may measure the sensing signal value of the odd-numbered electrode (e.g., odd-numbered column data or odd-numbered row data) and the sensing signal value of the even-numbered electrode (e.g., even-numbered column data or even-numbered row data) included in the touch sensing unit TSU (step S120). The second touch driving circuit 420 may measure, the sensing signal value of each of the odd-numbered column first electrode, e.g., the (1-1) electrode IE1-1, and the even-numbered column first electrode, e.g., the (1-2) electrode IE1-2 among the plurality of electrodes IE1 and IE2 having the row-and-column arrangement. In addition, the second touch driving circuit 420 may measure the sensing signal value of each of the odd-numbered row second electrode, e.g., the (2-1) electrode IE2-1, and the even-numbered row second electrode, e.g., the (2-2) electrode IE2-2 among the plurality of electrodes IE1 and IE2 having the row-and-column arrangement.

If the sensing signal value of the odd-numbered electrode is greater than the sensing signal value of the even-numbered electrode (yes in step S130), the touch driving circuit 400 may select the sensing signal value sensed by the odd-numbered electrode (step S140). If the sensing signal value of the odd-numbered electrode is smaller than the sensing signal value of the even-numbered electrode (no in step S130), the touch driving circuit 400 may select the sensing signal value sensed by the even-numbered electrode (step S150).

When the touch driving circuit 400 selects a sensing signal value of one of the odd-numbered electrode and the even-numbered electrode, the coordinate values of the electronic pen 30 may be calculated using. the selected sensing signal value (step S160).

The touch driving circuit 400 may further include a selector that selects a larger value between the odd-numbered column data and the even-numbered column data as the first coordinate axis sensing data and selects a larger value between the odd-numbered row data and the even-numbered row data as second coordinate axis sensing data, and a processor that calculates coordinates based on the selected value(s). In other words, the selector may select a sensing signal value of an electrode exhibiting a high sensing signal value from a sensing sensitivity graph. The processor may calculate coordinate values using the sensing signal value selected by the selector.

in other words, since the display device 1 may calculate the coordinate values by selecting a larger value among the measured sensing signal values, it is possible to sense accurate coordinate values even though the touch by the electronic pen 30 is made at various positions.

For example, in the touch sensing unit TSU including an odd-numbered column first electrode having the second end in the first direction DR1 connected to the first routing line RL1 and an even-numbered column first electrode haying the first end in the first direction DR1 connected to the first routing line RL1, when the electronic pen 30 is proximate to the second side in the first direction DR1, the sensing signal value of the odd-numbered column first electrode may be measured as a larger one. As another example, when the electronic pen 30 is proximate to the first side in the first direction DR1, the sensing signal value of the even-numbered column first electrode may be measured as a larger one. The selector may select a larger value among the measured sensing sensitivity values, and the processor may calculate a coordinate value on the first coordinate axis using the selected value.

Incidentally, the sensing; range of the electronic pen 30 by electromagnetic sensing may be approximately 60 mm. For example, the electronic pen 30 by electromagnetic sensing may sense induced currents and induced voltages flowing through approximately fifteen unit sensing areas SUT at once. In this case, for example, it is assumed that the number of electrodes measured on the graph by one sensing is fifteen, In other words, the (1-1) electrode IE1-1 may include a plurality of $(2n+1)^{th}$ first electrodes #2n+1 IE1, where n is an integer equal to or less than seven. The (1-2) electrode IE1-2 may include a plurality of $2n^{th}$ first electrodes #2n IE1, where n is an integer equal to or less than seven. The (2-1) electrode IE2-1 may include a plurality of $(2n+1)^{th}$ second electrodes IE2, where n is an integer equal to or less than seven. The plurality of (2-2) electrodes IE2-2 may include a plurality of $2n^{th}$ second electrodes #2n IE2, where n is an integer equal to or less than seven. It should be noted that the numbers of the electrodes are merely illustrative and the disclosure is not limited thereto.

Figure 16:
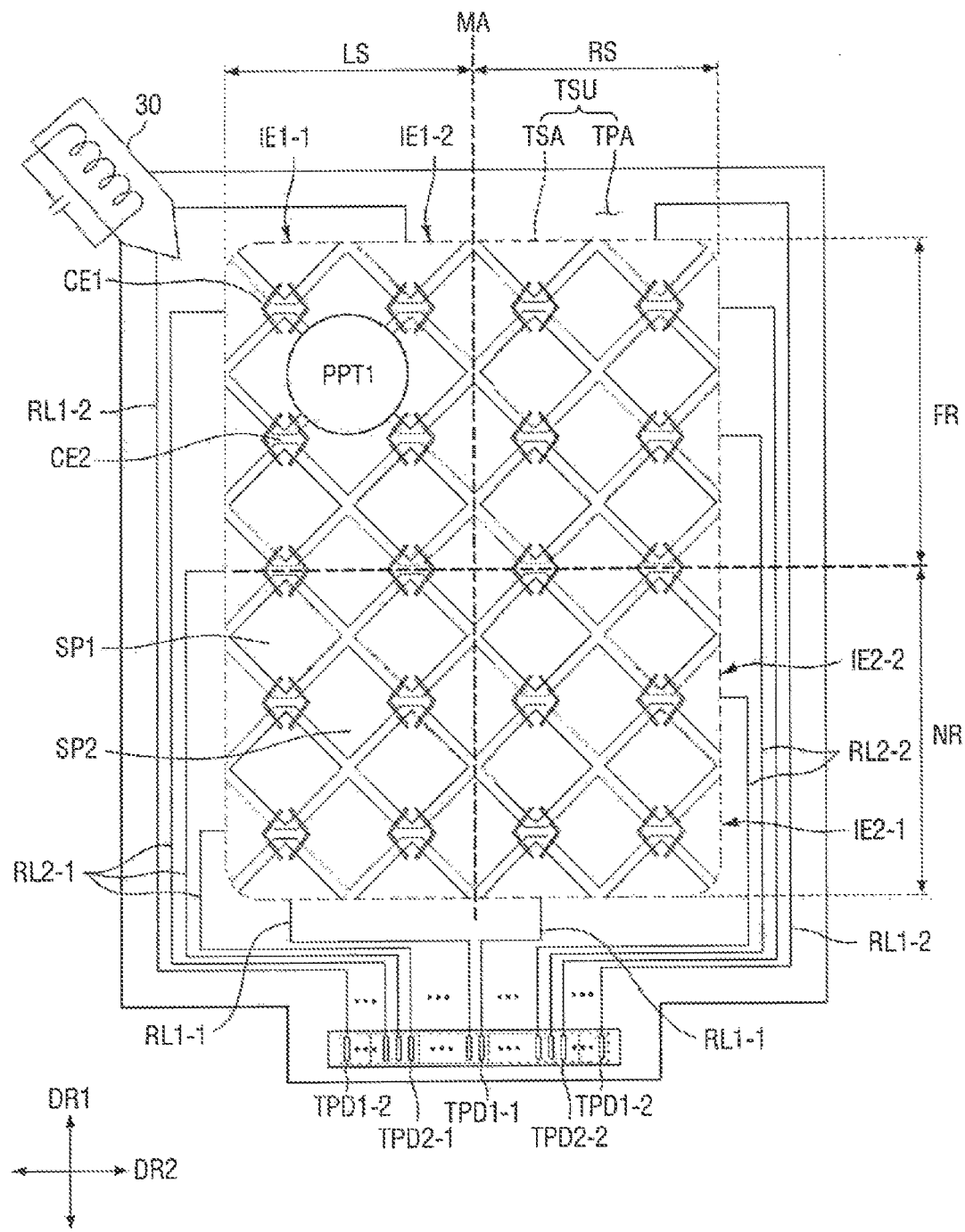
FIG. 16 is a diagram schematically showing a touch sensing unit when an electronic pen is located at a first region and a first side in a display device according to an embodiment of the disclosure.

FIG. 16 is a diagram schematically showing a touch sensing unit when an electronic pen is located at a first region and a first side in a display device according to an embodiment of the disclosure.

Figure 17:
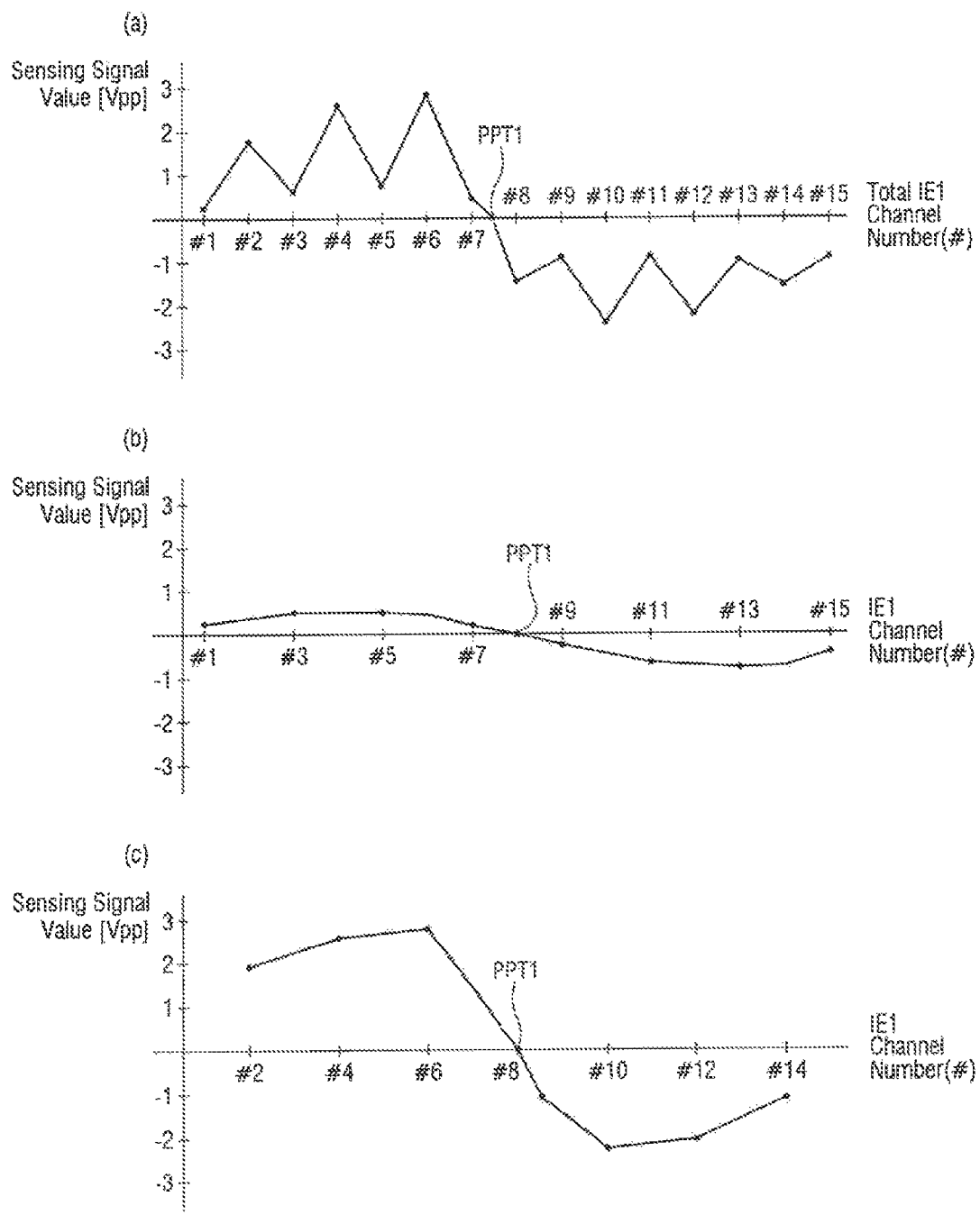
FIG. 17 is a sensing sensitivity graph of the first coordinate axis according to FIG. 16.

FIG. 17 is a sensing sensitivity graph of the first coordinate axis according to FIG. 16. For example, FIG. 17A is a graph in which all sensing sensitivities according to the plurality of first electrodes IE1 are measured when a position PPT1 of the electronic pen 30 is in a first region FR, FIG. 17B is a graph of measuring the sensing sensitivity of a plurality of $(2n+1)^{th}$ first electrodes #2n+1 IE1, and FIG. 17C is a graph of measuring the sensing sensitivity of the $2n^{th}$ first electrode #2n IE1.

In the following description, for convenience of illustration, the region of the touch sensor area TSA on the first side of the first direction DR1 that is farther from the touch pad areas TPD with respect to the central axis extended in the second direction DR2 is referred to as a first region FR, while the region of the touch sensor area TSA on the second side of the first direction DR1 closer to the touch pad areas TPD with respect to the central axis is referred to as a second region NR. In addition, in the touch sensor area TSA, one side of the second direction DR2 which is the left side of the central axis MA extended in the first direction DR1 is referred to as a first side LS, while the opposite side of the second. direction DR2 which is the right side of the central axis MA is referred to as a second side RS.

Referring to FIGS. 16 and 17, when the position PPT1 of the electronic pen 30 is located in the first region FR farther from the touch pad areas TPD, the electronic pen 30 is proximate to the end of the (1-2) electrode IE1-2 in the first direction DR1 to which the (1-2) routing line RL1-2 is connected around the left, edge (e.g., the longer side) of the touch sensor area TSA. On the other hand, the electronic pen 30 is located relatively far from the second end of the (1-1) electrode IE1-1 in the first direction DR1 which is connected to the (1-1) routing line RL1-1. Accordingly, it can be expected that the (1-2) electrodes IE1-2 have high sensing signal values, while the (1-1) electrodes IE1-1 have relatively low sensing signal values.

Referring to FIG. 17A showing the sensing sensitivity graph for all the first electrodes IE1 in which a sensing signal is sensed, it can be seen that the sensing signal values of the odd-numbered first electrodes (1-1 electrodes) and the even-numbered first electrode (1-2 electrodes) increase and decrease irregularly. Therefore, measurement errors may not be filtered out and the accurate position PPT of the electronic pen 20 may not be located only with the graph of FIG. 17A.

On the other hand, referring to FIG. 17B showing only the sensing signal values of the (1-1) electrodes and FIG. 17C showing only the sensing signal values of the (1-2) electrodes, it can be seen that the values increase and decrease relatively regularly across neighboring electrodes. Therefore, it is easier to determine the error compared to FIG. 17A.

In addition, comparing the graph of FIG. 17B with the graph of FIG. 17C, the deviations in the sensing signal values for the electrodes are larger in the graph of FIG. 17C. Therefore, the data in the graph of FIG. 17C is more reliable than that of FIG. 17B. Therefore, the graphs of FIGS. 17B and 17C are plotted using the sensing values obtained from the plurality of first electrodes IE1, and then the graphs are compared with each other. The graph having a larger sensing sensitivity is selected by the selector, so that the coordinate value of the first coordinate axis can be calculated more precisely by the processor based on the graph having the larger sensing sensitivity. In other words, since the electronic pen 30 has the voltage value of 0 V at the position PPT1, when the deviations of the sensing signal value are large, the coordinate values where the electronic pen 30 is located can be more accurately determined.

As described above, since the first routing lines RL1 are alternately connected to the first side and the second side of the first electrodes IE1 in the first direction DR1, the sensing signal value of the electrode close to the position of the electronic pen 30 can be measured larger, thus, it is possible to sense accurate coordinate values based thereon.

Figure 18:
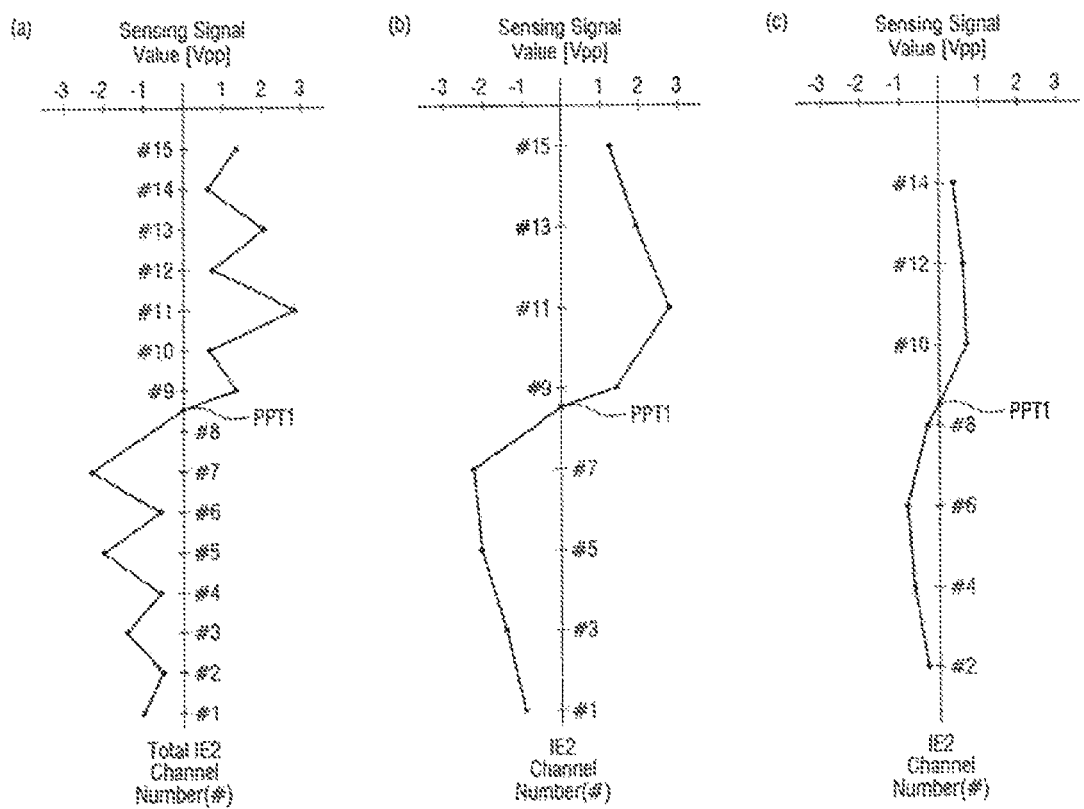
FIG. 18 is a sensing sensitivity graph of the second coordinate axis according to FIG. 16.

FIG. 18 is a sensing sensitivity graph of the second coordinate axis according to FIG. 16. FIG. 18A is a graph in which all sensing sensitivities according to a plurality of second electrodes IE2 are measured. FIG. 18B is a graph in which the sensing sensitivities of a plurality of $(2n+1)^{th}$ second electrodes #2n±1 IE2 are measured. FIG. 18C is a graph in which sensing sensitivities of a plurality of $2n^{th}$ second electrodes #2n IE2 are measured.

Referring to FIGS. 16 and 18, as described above with reference to FIG. 17, the sensing signal values increase and decrease irregularly in FIG. 18A, whereas the values increase and decrease relatively regularly across neighboring electrodes in FIGS. 18B and 18C. When FIG. 18B and FIG. 18C are compared with each other, FIG. 18B shows larger deviations in the sensing signal values across the electrodes, and thus may be selected by the selector. Based on this selection, the processor can precisely calculate the coordinate values of the second coordinate axis.

In conclusion, the coordinates of the electronic pen 30 located in the first region FR and the first side LS of FIG. 16 can be precisely calculated based on FIG. 17C showing the sensing signal value of the (1-2) electrode IE1-2 and FIG. 18B showing the sensing signal value of the (2-1) electrode IE2-1.

Figure 19:
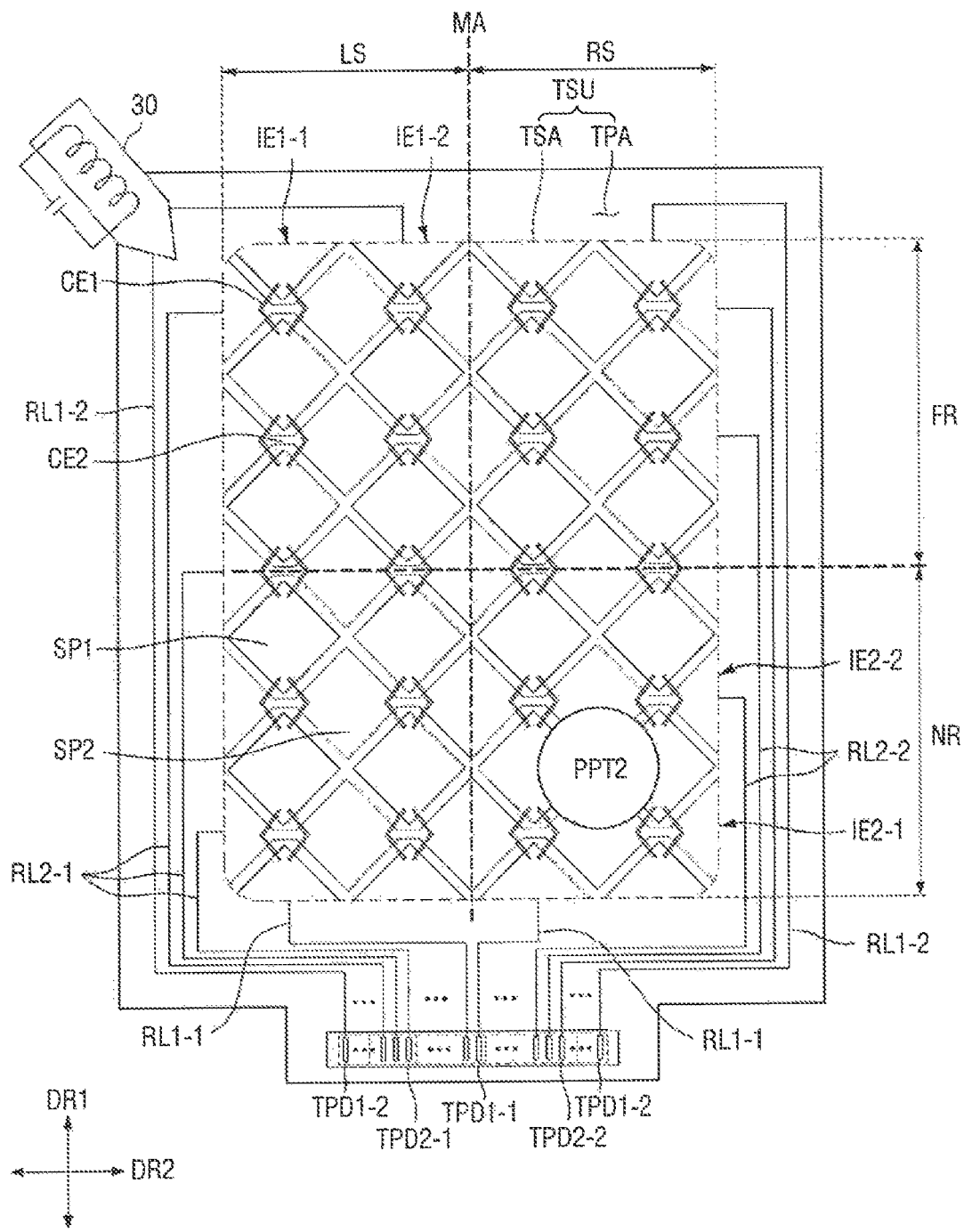
FIG. 19 is a diagram schematically showing a touch sensing unit when an electronic pen is located at a second region and a second side in a display device according to an embodiment of the disclosure.
Figure 20:
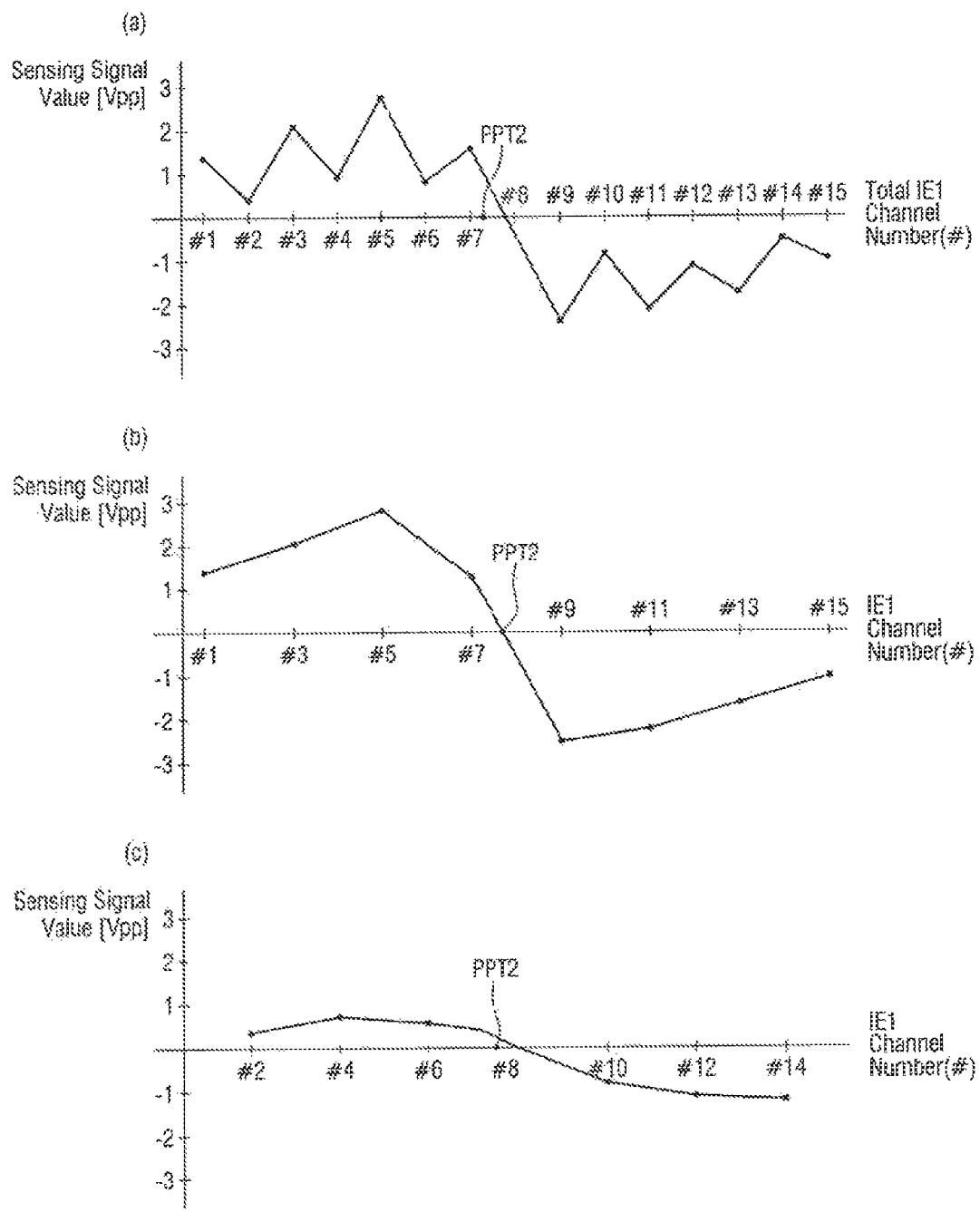
FIG. 20 is a sensing sensitivity graph of the first coordinate axis according to FIG. 19.
Figure 21:
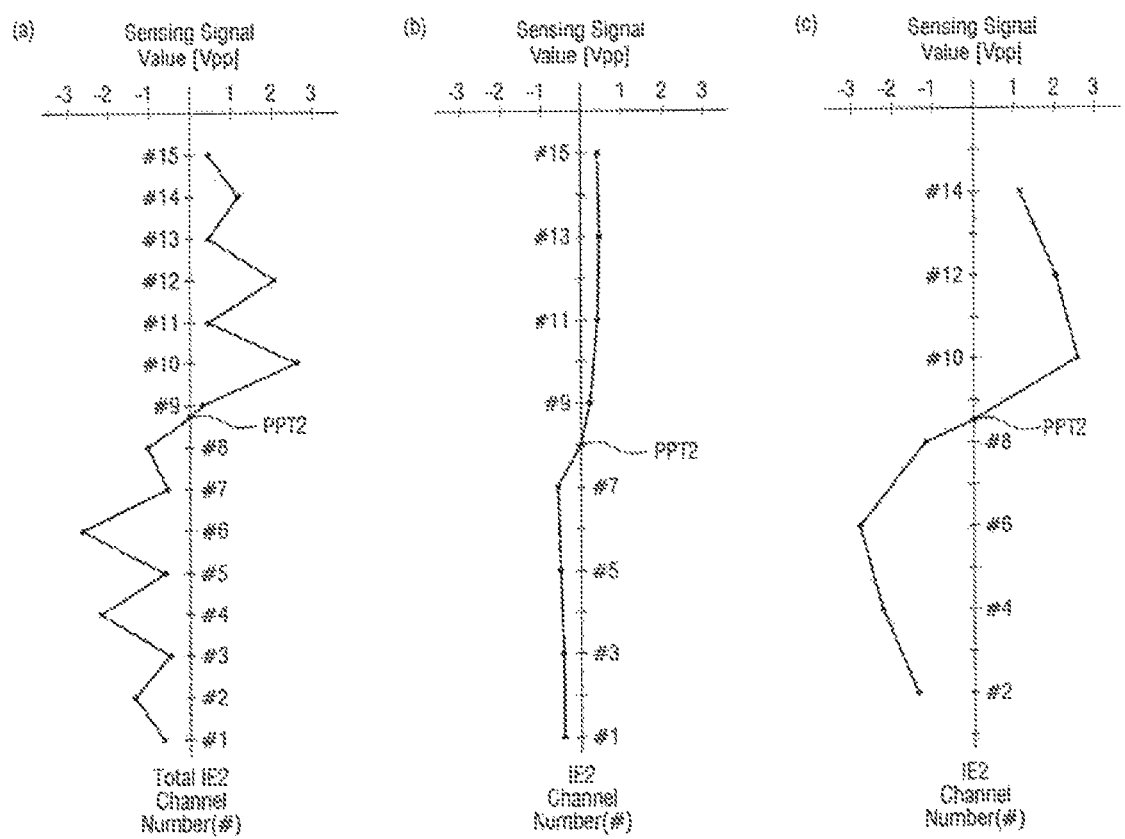
FIG. 21 is a sensing sensitivity graph of the second coordinate axis according to FIG. 19.

FIG. 19 is a diagram schematically showing a touch sensing unit when an electronic pen is located at a second region and a second side in a display device according to an embodiment of the disclosure. FIG. 20 is a sensing sensitivity graph of the first coordinate axis according to FIG. 19. FIG. 21 is a sensing sensitivity graph of the second coordinate axis according to FIG. 19.

For example, FIG. 20A is a graph in which all sensing sensitivities according to the plurality of first electrodes TEA are measured. FIG. 20B is a graph in which the sensing sensitivities of a plurality of $(2n+1)^{th}$ first electrodes #2n+1 IE1 are measured, and FIG. 20C is a graph in which the sensing sensitivities of a plurality of $2n^{th}$ second electrodes #2n IE1 are measured. In addition, FIG. 21A is a graph in which all sensing sensitivities according to the plurality of second electrodes IE2 are measured, FIG. 21B is a graph in which the sensing sensitivities of a plurality of $(2n+1)^{th}$ second electrodes #2n+1 IE2 are measured, and FIG. 21C is a graph in which the sensing sensitivities of a plurality of $2n^{th}$ second electrodes #2n IE2 are measured.

Referring to FIGS. 19 to 21, a position PPT2 of the electronic pen 30 is different in that it is in the second. region NR and the second side RS, and the process of determining the coordinates of the electronic pen 30 is the same as the previous one. In other words, since the position PPT2 of the electronic pen 30 may not be accurately determined only with FIGS. 20A and 21A showing the sensing sensitivity graphs for all the first electrodes IE1 and the second electrodes IE2 in which the sensing signals are sensed, it may be easy to determine errors by measuring the sensing signal values of the odd-numbered electrode and the even-numbered electrode separately.

In addition, referring to the graphs of FIGS. 20 and 21, the (1-1) electrodes IE1 -1 ma have higher sensing signal values while the (1-2) electrodes IE1-2 may have lower sensing signal values. The (2-1) electrodes IE2-1 may have higher sensing signal values while the (2-2) electrodes IE2-2 may have lower sensing signal values.

Thus, the coordinates of the electronic, pen 30 located in the second region NR and the second side RS of FIG. 19 can be precisely calculated based on FIG. 20B showing the sensing signal value of the (1-1) electrode IE1-1 and FIG. 21C showing the sensing signal value of the (2-2) electrode IE2-2.

Therefore, since the routing lines RL1 and RL2 are alternately connected to the first side and the second side of the electrodes IE1 and IE2, the sensing signal value of the electrode close to the position of the electronic pen 30 can be measured larger, and thus accurate coordinate values can be calculated using it.

Incidentally, the above-described driving and sensing operations of the touch driving circuit are usually performed after a touch input is made, and there may be a standby time before the touch input is sensed. Hereinafter, the operation timing of the touch driving circuit will be described.

Figure 22:
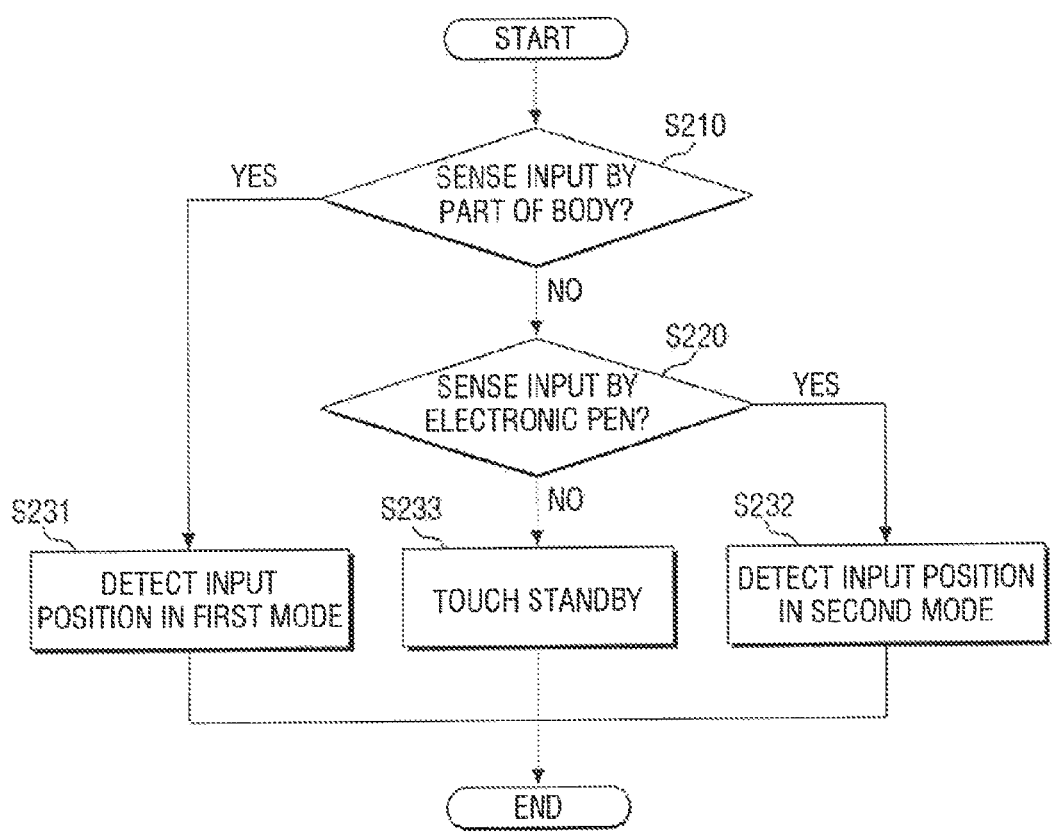
FIG. 22 is a flowchart illustrating a process of distinguishing a first mode, a second mode, or a standby mode depending on whether an external touch is sensed, according to an embodiment of the disclosure.

FIG. 22 is a flowchart illustrating a process of distinguishing a first mode, a second mode, or a standby mode depending on whether an external touch is sensed, according to an embodiment of the disclosure, Referring first to FIG. 22, it is sensed whether a touch input is made by a part of the body 20 (step S210), If the plurality of electrodes IE1 and IE2 (see FIG. 8) included in the touch sensing unit TSU senses a touch input by a part of the body 20 (yes in step S210), the first mode is selected. Accordingly, the first touch driving circuit 410 may detect the input position of the part of the body 20 in the manner described above with reference to FIGS. 8 and 9 (step S231).

If the touch sensing unit TSU does not sense any touch input by a part of the body 20 (no in step S210), it may be sensed whether the electronic pen 30 is input (step S220). If the touch sensing unit TSU senses an input by the electronic pen 30 (yes in step S220), the second mode is selected. Accordingly, the second touch driving circuit 420 may detect the input position of the electronic pen (step S232). A method in which the second touch driving circuit 420 detects the input position of the electronic pen has been described above with reference to FIGS. 10 to 21.

If the touch sensing unit TSU does not sense any input by the electronic pen 30 (no in step S220), the touch driving circuit 400 may remain in the touch standby state (if it was previously in the standby state) or may enter the standby state (if it was not previously in the standby, state) (step S233).

Figure 23:
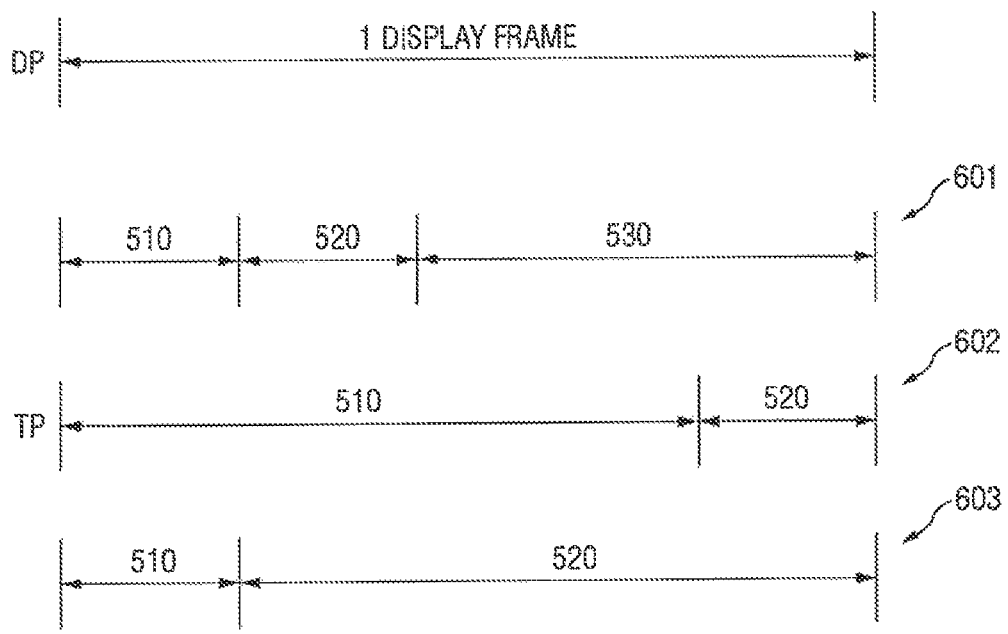
FIG. 23 is a diagram showing driving timings of a display driving circuit and a touch driving circuit in a display device according to an embodiment of the disclosure.

FIG. 23 is a diagram showing driving timings of a display driving circuit and a touch driving circuit in a display device according to an embodiment. of the disclosure.

Referring to FIG. 23, the touch sensing unit TSU may perform display driving for displaying an image during a predetermined display driving period DP, and may perform touch driving for sensing a touch input by a part of the body 20 or the electronic pen 30 during a predetermined touch driving. period TP.

The display driving period DP and the touch driving period TP may be the same or overlap each other in time, or may be separated from each other in time. In the following example, the display driving period DP and the touch driving period TP overlap each other in time.

During the display driving period DP, the display driving circuit 200 may drive the display unit DU at a certain frequency. The display driving circuit 200 may perform display driving for displaying an image during a first display frame period.

The touch driving period TP may include a touch recognition period 601, a first-mode sensing period 602, and a second-mode sensing period 603.

A touch recognition period 601 precedes the sensing an input by a part of the body 20 and the electronic pen 30, which have been described above with reference to FIG. 22. The touch recognition period 601 may include a first-mode period 510 for sensing an input by a part of the body 20, a second-mode period 520 for sensing an input by the electronic pen 30, and a standby period 530. In the touch recognition period 601, the first-mode period 510 and the second-mode period 520 may be so short in time that only an input can be sensed in these periods. In this case, the first-mode period 510 and the second-mode period 520 may not be long enough to detect the input coordinates. The standby period 530 of the touch recognition period 601 occupies a longer time than the first-mode period 510 and the second-mode period 520. By doing so, driving power consumption can be saved.

If an input by a part of the body 20 is made on the display device 1, the input is sensed in the first-mode period 510 of the touch recognition period 601. If the input by a part of the body 20 is sensed, the touch driving circuit 400 changes the touch driving period TP to a first-mode sensing period 602.

The first-mode sensing period 602 includes the first-mode period 510 having a time long enough to detect input coordinates. During the first-mode period 510, the input position according to the first mode is detected in the manner described above with reference to FIGS. 8 and 9. On the other hand, the first-mode sensing period 602 may further include the second-mode period 520 which is shorter than the first-mode period 510 and thus is capable only of sensing whether there is an input or not. During the second-mode period 520, the touch sensing unit TSU senses whether there is an input by an electronic pen 30.

If it is sensed that there is an input by the electronic pen 30 in the second-mode period 520 of the touch recognition period 501 or the second-mode period 520 of the first-mode sensing period 602, the touch driving circuit 400 changes the touch driving period TP to a second-mode sensing period 603.

The second-mode sensing period 603 includes the second-mode period 520 having a time long enough to detect input coordinates. During the second-mode period 520, the input position according to the second mode is detected in the manner described above with reference to FIGS. 10 to 21. On the other hand, the second-mode sensing period 603 may further include the first-mode period 510 which is shorter than the second-mode period 520 and thus is capable only of sensing whether there is an input or not. During the second-mode period 520, the touch sensing unit TSU senses whether there is an input by a part of the body 20.

If an input by the electronic pen 30 is sensed in the second-mode period 520 during the first-mode sensing period 602 or if an input by a part of the body 20 is sensed in the first-mode period 510 during the second-mode sensing period 603, a mixed mode sensing period may be entered in which the first-mode sensing period 602 and the second-mode sensing period 603 are alternately arranged. In the mixed mode sensing period, the first-mode period 510 having a time long enough for detecting input coordinates, the second-mode period 520 having a time long enough for detecting input coordinates may be repeated alternately.

When no more sensing data is received in the first-mode sensing period 602 and the second-mode sensing period 603, it may be changed back to the touch recognition period 601.

Figure 24:
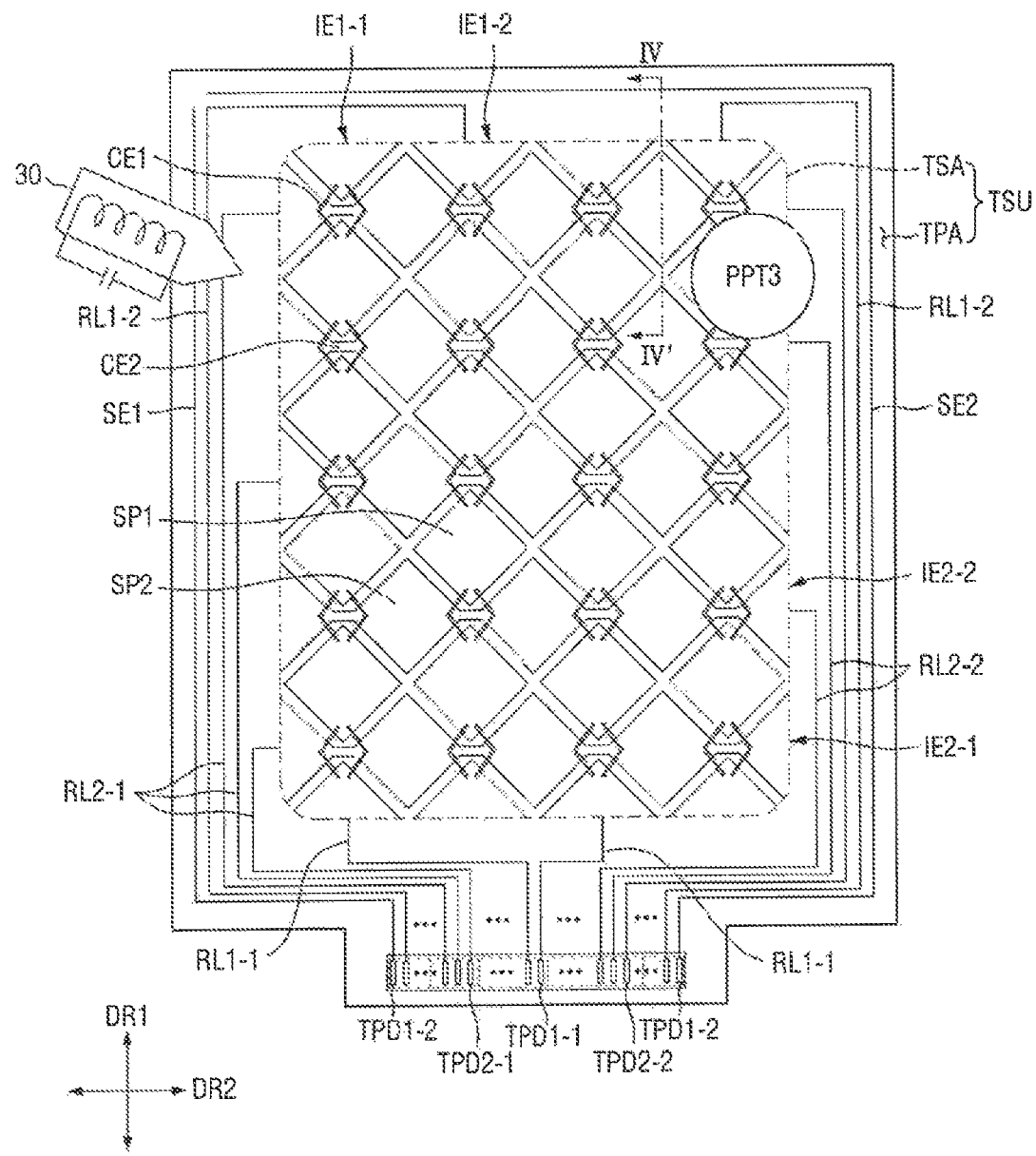
FIG. 24 is a plan view showing a layout of a touch sensing unit in a display device according to another embodiment of the disclosure.
Figure 25:
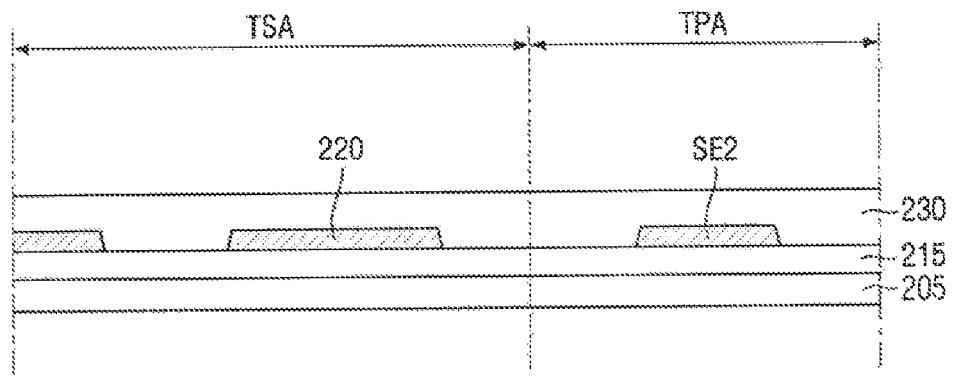
FIG. 25 is a cross-sectional view taken along line IV-IV' of FIG. 24.
Figure 26:
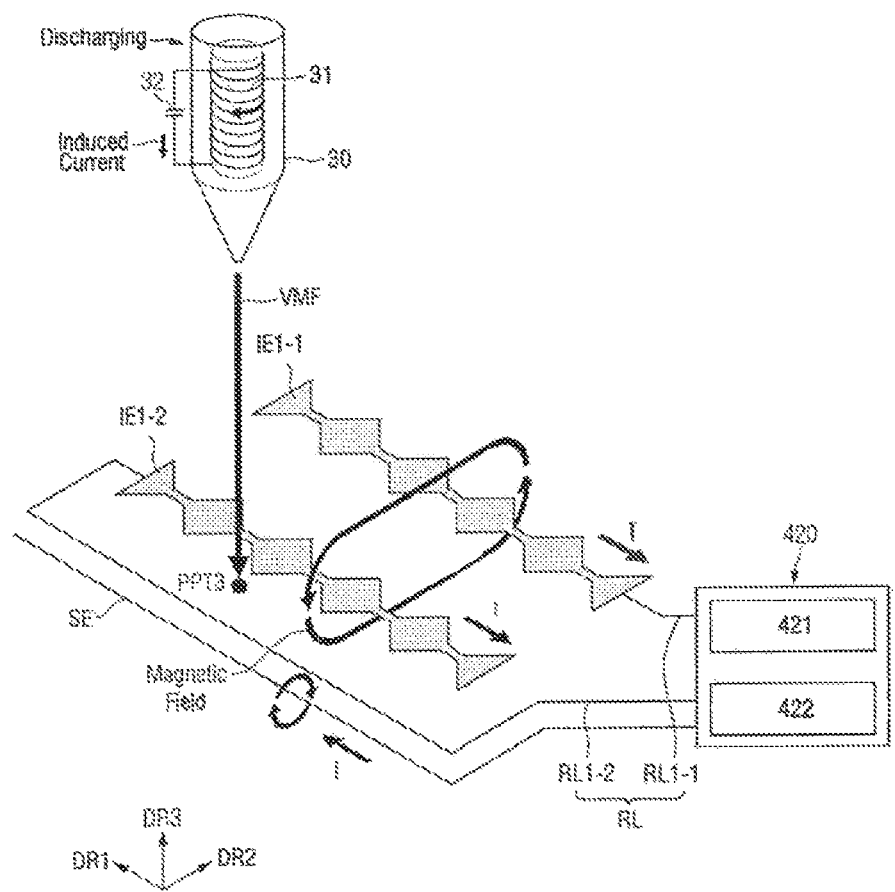
FIG. 26 is a view showing a touch sensing process when an electronic pen is at an edge of a display device according to another embodiment of the disclosure.
Figure 27:
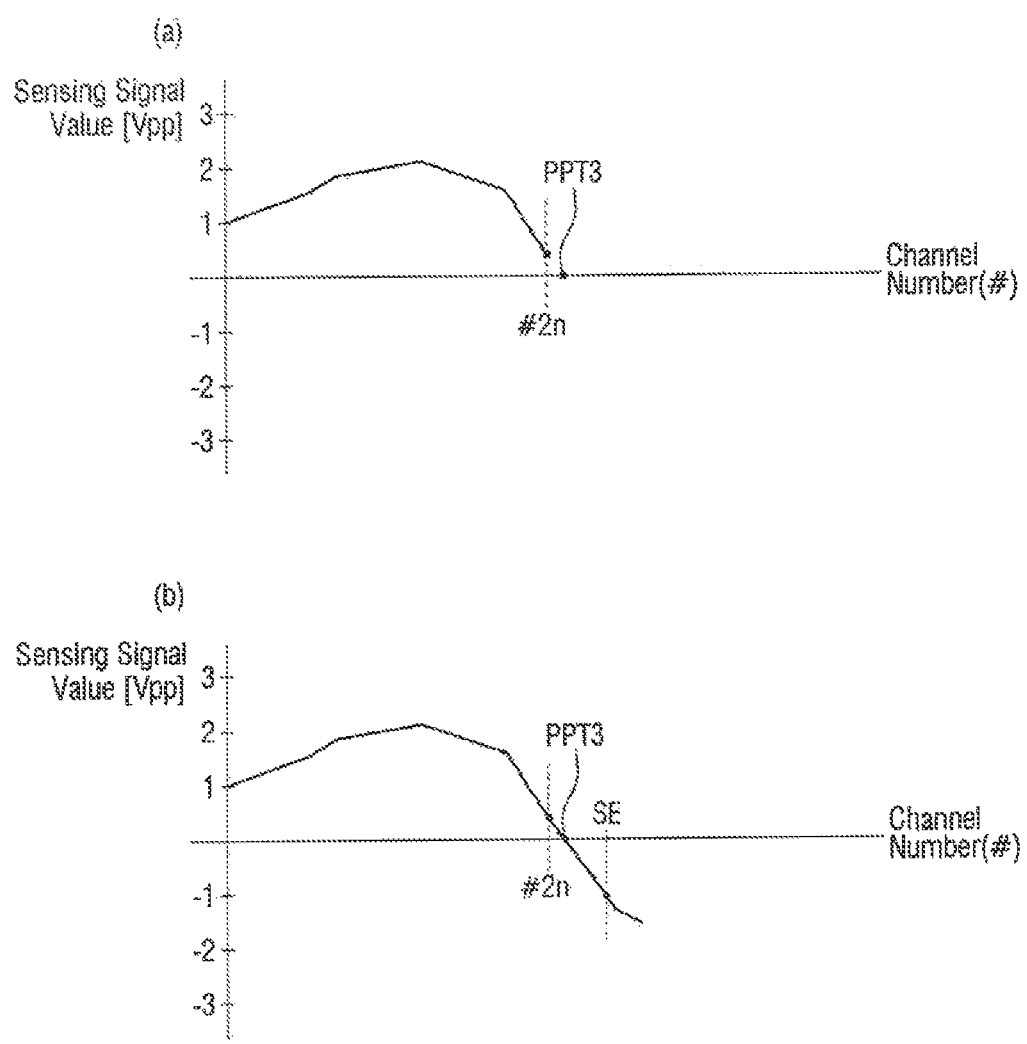
FIG. 27 is a sensing sensitivity graph when the position of the electronic pen is at the edge in a display device according to another embodiment of the disclosure.

Hereinafter, a display device according to another embodiment of the disclosure will be described with reference to FIGS. 24 to 27. FIG. 24 is a plan view showing a layout of a touch sensing unit in a display device according to another embodiment of the disclosure. FIG. 25 is a cross-sectional view taken along line IV-IV' of FIG. 24. FIG. 26 is a view showing a touch sensing process when an electronic pen is at an edge of a display device according to another embodiment of the disclosure. FIG. 27 is a graph of sensing sensitivity when the position of the electronic pen is at the edge.

The display device according to the embodiment of FIG. 24 is different from the display device according to the above-described embodiment in that auxiliary electrodes SE are disposed in the touch peripheral area TPA.

For example, the display device may further include auxiliary electrodes SE disposed at the outermost portions of the routing lines RL1 and RL2 in the touch peripheral area TPA.

The auxiliary electrodes SE are disposed such that they surround the electrodes IE1 and IE2 of the touch sensor area TSA, A gap may be provided between the auxiliary electrodes SE such that they do not completely surround the touch sensor area TSA. Furthermore, the auxiliary electrodes SE may be disposed such that they surround even the routing lines RL1 and RL2. The auxiliary electrodes SE may be disposed in an open loop shape. One end of each of the auxiliary electrodes SE may be connected to the touch pad areas TPD like the first electrodes IE1 or the second electrodes IE2. The other ends of the auxiliary electrodes SE may be open.

The auxiliary electrodes SE may be disposed on the same layer as the routing lines RL1 and RL2. The auxiliary electrodes SE may have the same stack structure as the routing lines RL1 and RL2. The auxiliary electrodes SE may not be connected to the first electrodes IE1 or the second electrodes IE2. For example, as shown in FIG. 25, a second auxiliary electrode SE2 may be disposed on the same layer as the second touch conductive layer 220 and may be insulated from the second touch conductive layer 220 by the second touch insulating layer 230.

The auxiliary electrodes SE are disposed to overlap the cathode electrode 180 of the display unit in the thickness direction, so that they may form the capacitor together with the cathode electrode 180, like the first sensor portions SP1 of the first electrodes IE1 and the second sensor portions SP2 of the second electrodes IE2. In addition, the auxiliary electrodes SE may include intrinsic resistance and inductance components. Accordingly, like the first electrodes IE1 and the second electrodes IE2, an induced current and an induced voltage may be generated in the auxiliary electrodes SE by the magnetic field radiated from the electronic pen 30. In this manner, the auxiliary electrodes SE may perform the functions of the first electrode line or the second electrode line in the same manner as the electrodes IE1 and IE2 of the touch sensor area TSA. Accordingly, the auxiliary electrodes SE may expand the graph regarding the sensing signal values of the first electrodes IE1 and the second electrodes IE2 in the second mode.

The auxiliary electrodes SE may have a larger line width than the routing lines RL1 and RL2 to perform a sufficient function as electrode lines of the second mode. Furthermore, the capacitor of the auxiliary electrodes SE can help to hold potentials of the first electrodes IE1 and the second electrodes IE2 of the adjacent touch sensor area TSA. In addition, the auxiliary electrodes SE surround the touch sensor area TSA and the routing lines RIA and RL2 and may further serve to prevent introduction of static electricity.

The auxiliary electrodes SE may include a first auxiliary electrode SE1 covering the (1-2) routing line RL1-2 on the first side of the touch sensor area ISA in the second direction DR2, and a second auxiliary electrode SE2 covering the (1-2) routing line RL1-2 on the second side of the touch sensor area TSA in the second direction DR2 and on the first side in the first direction. UR1. For example, the first auxiliary electrode SE1 may be adjacent to the (1-2) routing line RL1-2 on the first side of the touch sensor area ISA, and the second auxiliary electrode SE2 may be adjacent to the (1-2) routing line RL1-2 on the second side of the touch sensor area TSA. The first auxiliary electrode SE1 and the second auxiliary electrode SEF may not be connected to each other but may be separated from each other.

The first auxiliary electrode SE1 includes a part extended in the first direction DR1. and the part of the first auxiliary electrode SE1 provides a sensing signal value of the first coordinate axis. like the first electrodes IE1. In other words, the first auxiliary electrode SE1 provides an additional first electrode line on the outer side of the left edge of the touch sensor area TSA, to expand the channel of the sensing sensitivity graph plotted with respect to the first coordinate axis. In addition, when the first auxiliary electrode SE1 includes a part extended in the second direction DR2, the first auxiliary electrode SE1 further provides the sensing signal value of the second coordinate axis on the outside of the second electrodes IE2.

The second auxiliary electrode SE2 includes a part extended in the first direction DR1 on the outer side of the right edge of the touch sensor area TSA and the part of the second auxiliary electrode SE2 provides an additional first electrode line, to expand the channel of the sensing sensitivity graph plotted with respect to the first coordinate axis. In addition, the second auxiliary electrode SE2 includes a part extended in the second direction DR2, the part of the second auxiliary electrode SE2 provides an additional second electrode line, to expand the channel of the sensing sensitivity graph plotted with respect to the second coordinate axis. The sensing signal value sensed by the second auxiliary electrode SE2 may be applied to both the sensing sensitivity graph on the first coordinate axis and the sensing sensitivity graph on the second coordinate axis.

Referring to FIGS. 24 and 26, when a position PPT3 of the electronic pen 30 is at the edge of the first electrode IE1, the coordinate values on the first coordinate axis may be determined by the induced current and the induced voltage sensed by the plurality of (1-1) and (1-2) electrodes IE1-1 and IE1-2.

When the magnetic field VMF directed in the opposite direction to the third direction DR3 passes through the position PPT3, an induced current may flow also in the auxiliary electrodes SE as well as the adjacent (1-1) electrodes IE1-1 and (1-2) electrodes IE1-2. The induced current flowing through the auxiliary electrodes SE is reflected in the sensing sensitivity graph as shown in FIG. 27B, and is used to accurately detect the position PPT3 of the electronic pen 30.

FIG. 27 is a sensing sensitivity graph of the first coordinate axis according to some embodiments of the disclosure. FIG. 27A shows a sensing sensitivity graph according to the electrode arrangement of FIG. 12, and FIG. 27B shows a sensing sensitivity graph according to the electrode arrangement of FIG. 26.

Referring to FIG. 27A, when the electronic pen 30 is at the edge when no auxiliary electrode SE is disposed, the $2n^{th}$ first electrode #2n IE1 may have a sensing signal value in the (+) direction, but the voltage increasing in the (−) direction is not measured. Since the measured graph does not include the potential of 0 V, the position PPT3 of the electronic pen 30 may not be accurately sensed.

Referring to FIG. 278, when the electronic pen 30 is at the edge when the auxiliary electrodes SE are disposed, the current induced by the auxiliary electrodes SE have an induced voltage in the (−) direction. Therefore, the position PPT3 of the electronic pen 30 can be accurately sensed. In this manner, the auxiliary electrodes SE can increase the touch precision at the edge to thereby further increase the touch performance Features of various embodiments of the disclosure may be combined partially or totally. Various embodiments of the disclosure can be practiced individually or in combination.

It is to be understood that those skilled in the art will appreciate that many variations and modifications can be made to the disclosed embodiments without departing from the scope of the disclosure. Therefore, the disclosed embodiments are used in a descriptive sense and are not limiting.

What is claimed is:

1. A touch member, comprising:
a first electrode disposed in a touch sensor area and extending in a first direction;
a second electrode disposed in the touch sensor area and extending in a second direction crossing the first direction;
touch pad areas located in a touch peripheral area around the touch sensor area; and
routing lines located in the touch peripheral area to connect the first electrode and the second electrode with the touch pad areas,
wherein the routing lines comprise a (1-1) routing line, a (1-2) routing line, a (2-1) routing line, and a (2-2) routing line,
the first electrode comprises a (1-1) electrode having a first end not connected to the routing lines and a second end connected to the (1-1) routing line, and a (1-2) electrode having a first end connected to the (1-2) routing line and a second end not connected to the routing lines,
the second electrode comprises a (2-1) electrode having a first end connected to the (2-1) routing line and a second end not connected to the routing lines, and a (2-2) electrode having a first end not connected to the routing lines and a second end connected to the (2-2) routing line,
the (1-1) electrode and the (1-2) electrode are alternately arranged in the second direction, and
the (2-1) electrode and the (2-2) electrode are alternately arranged in the first direction,
the touch member further comprising: a touch driving circuit for driving the first electrode and the second electrode,
wherein a touch driving period comprises a touch recognition period, a first-mode sensing period and a second-mode sensing period, and
wherein the touch recognition period comprises a standby period, a first mode period shorter than the standby period, and a second mode period shorter than the standby period, wherein only sensing for an input by a part of a body is made in the first mode period and only sensing for an input by an electronic pen is made in the second mode period.

2. The touch member of claim 1, wherein the (1-1) electrode and the (1-2) electrode each comprises first sensor portions arranged in the first direction and first connecting portions connecting between adjacent ones of the first sensor portions, and
wherein the (2-1) electrode and the (2-2) electrode each comprises second sensor portions arranged in the second direction and second connecting portions connecting between adjacent ones of the second sensor portions.

3. The touch member of claim 2, wherein the touch pad areas comprise a (1-1) touch pad area comprising at least one touch pad connected to the (1-1) routing line; a (1-2) touch pad area comprising at least one touch pad connected to the (1-2) routing line; a (2-1) touch pad area comprising at least one touch pad connected to the (2-1) routing line; and a (2-2) touch pad area comprising at least one touch pad connected to the (2-2) outing line, wherein the (1-2) touch pad area, the (2-1) touch pad area, the (1-1) touch pad area, the (2-2) touch pad area and the (1-2) touch pad area arranged sequentially in the second direction in the touch pad areas.

4. The touch member of claim 1, wherein the (1-2) routing line is extended around at least one edge of the touch sensor area.

5. The touch member of claim 1, wherein the touch driving circuit comprises a first driving signal supplying unit for providing a first-mode driving signal to the first electrode in a first mode; and
a first sensing signal receiving unit for receiving a first-mode sensing signal from the second electrode in the first mode.

6. The touch member of claim 5, wherein the touch driving circuit further comprises a second driving signal supplying unit for providing a second-mode driving signal to the first electrode and the second electrode in a second mode; and
a second sensing signal receiving unit for receiving a second-mode sensing signal from the first electrode and the second electrode in the second mode.

7. The touch member of claim 6, wherein the second-mode sensing signal received from the first electrode includes odd-numbered column data and even-numbered column data, and the touch driving circuit selects one of the odd-numbered column data and the even-numbered column data as first coordinate axis sensing data, and
the second-mode sensing signal received from the second electrode includes odd-numbered row data and even-numbered row data, and the touch driving circuit selects one of the odd-numbered row data and the even-numbered row data as second coordinate axis sensing data.

8. The touch member of claim 1, further comprising: an auxiliary electrode located in the touch peripheral area, and having a first end connected to the touch pad areas and a second end not connected to the first or second electrode.

9. The touch member of claim 8, wherein the auxiliary electrode is adjacent to an outer side of the routing lines.

10. A display device, comprising:
a display unit; and
a touch sensing unit disposed on the display unit,
wherein the touch sensing unit comprises:
a first electrode disposed in a touch sensor area and extending in a first direction;
a second electrode disposed in the touch sensor area and extending in a second direction crossing the first direction;
touch pad areas located in a touch peripheral area around the touch sensor area; and
routing lines located in the touch peripheral area to connect the first electrode and the second electrode with the touch pad areas,
wherein the routing lines comprise a (1-1) routing line, a (1-2) routing line, a (2-1) routing line, and a (2-2) routing line, the first electrode comprises a (1-1) electrode having a first end not connected to the routing line and a second end connected to the (1-1) routing line, and a (1-2) electrode having a first end connected to the (1-2) routing line and a second end not connected to the routing lines, the second electrode comprises a (2-1) electrode having a first end connected to the (2-1) routing line and a second end not connected to the routing lines, and a (2-2) electrode having a first end not connected to the routing lines and a second end connected to the (2-2) routing line, the (1-1) electrode and the electrode are alternately arranged in the second direction, and the (2-1) electrode and the electrode are alternately arranged in the first direction, the touch sensing unit senses a body input by sensing a change in mutual capacitance of the first and second electrodes in a first mode, the touch sensing unit senses an input by an electronic pen by sensing an induced current of he first electrode due to charging and discharging of the electronic pen in a second mode, wherein the first mode includes a first mode period having a time long enough to detect input coordinates associated with the body input and a second mode period shorter than the first mode period, the second mode period being only long enough to sense the input by the electronic pen, and wherein the second mode includes a third mode period having a time long enough to detect input coordinates of the electronic pen and a fourth mode period shorter than the third mode period the fourth mode period being only long enough to sense the body input.

11. The display device of claim 10, wherein the display unit comprises a plurality of pixels comprising an emission area and a non-emission area around the emission area, wherein the touch sensing unit comprises a first touch conductive layer, a second touch conductive layer, and a touch insulating layer interposed between the first touch conductive layer and the second touch conductive layer, and wherein the first touch conductive layer and the second touch conductive layer do not overlap the emission area.

12. The display device of claim 11, wherein the (1-1) electrode and the (1-2) electrode each comprises first sensor portions arranged in the first direction and first connecting portions connecting between adjacent ones of the first sensor portions, wherein the (2-1) electrode and the (2-2) electrode each comprises second sensor portions arranged in the second direction and second connecting portions connecting between adjacent ones of the second sensor portions, the first connecting portions are formed of the first touch conductive layer, and the first sensor portions, the second sensor portions and the second connecting portions are formed of the second touch conductive layer, and the routing lines comprise at least one of the first touch conductive layer and the second touch conductive layer.

13. The display device of claim 12, further comprising: an auxiliary electrode located in the touch peripheral area, and having a first end connected to the touch pad areas and a second end not connected to the first or second electrode, wherein the auxiliary electrode is disposed on an outer side of the routing lines.

14. The display device of claim 10, wherein the (1-2) routing line is extended around at least one edge of the touch sensor area.

15. The display device of claim 10, further comprising:
a touch driving circuit for driving the first electrode and the second electrode, wherein the touch driving circuit drives in the first mode and the second mode, and the touch driving circuit comprises a first driving signal supplying unit for providing a first-mode driving signal to the first electrode in the first mode, a first sensing signal receiving unit for receiving a f rst-r ode sensing signal from the second electrode in the first mode, a second driving signal supplying unit for providing a second-mode driving signal to the first electrode and the second electrode in the second mode, and a second sensing signal receiving unit for receiving a second-mode sensing signal from the first electrode and the second electrode in the second mode.

16. A display device, comprising:
a display panel comprising a display unit and a touch sensing unit disposed on the display unit;
a window disposed on the display panel;
a panel bottom member disposed under the display panel and comprising at least one of a heat dissipation sheet, an electromagnetic wave shielding sheet, and a buffer sheet; and
a mold frame accommodating the display panel, the window and the panel bottom member,
wherein the touch sensing unit comprises:
a first electrode disposed in a touch sensor area and extended in a first direction;
a second electrode disposed in the touch sensor area and extended in a second direction crossing the first direction;
touch pad areas located in a touch peripheral area around the touch sensor area; and
routing lines located in the touch peripheral area to connect the first electrode and the second electrode with the touch pad areas,
wherein the routing lines comprise a (1-1) routing line, a (1-2) routing line, a (2-1) routing line, and a (2-2) routing line,
the first electrode comprises a (1-1) electrode having a first end not connected to the routing lines and a second end connected to the (1-1) routing line, and a (1-2) electrode having a first end connected to the (1-2) routing line and a second end not connected to the routing lines,
the second electrode comprises a (2-1) electrode having a first end connected to the (2-1) routing line and a second end not connected to the routing lines, and a (2-1) electrode having a first end not connected to the routing lines and a second end connected to the (2-2) routing line,
the (1-1) electrode and the (1-2) electrode are alternately arranged in the second direction, and
the (2-1) electrode and the (2-2) electrode are alternately arranged in the first direction,
the touch sensing unit senses a body input by sensing a change in mutual capacitance of the first and second electrodes in a first mode, the touch sensing unit senses an input by an electronic pen by sensing an induced current of the first electrode due to charging and discharging of the electronic pen in a second mode, wherein the first mode includes a first mode period having a time long enough to detect input coordinates associated with the body input and a second mode period shorter than the first mode period, the second mode period being only long enough to sense the input by the electronic pen, and wherein the second mode includes a third mode period having a time long enough to detect input coordinates of the electronic pen and a fourth mode period shorter than the third mode period, the fourth mode period being only long enough to sense the body input.

17. The display device of claim 16, wherein the (1-2) routing line is extended around at least one edge of the touch sensor area.

18. The display device of claim 17, further comprising: a touch driving circuit for driving the first electrode and the second electrode, wherein the touch driving circuit comprises a first driving signal supplying unit for providing a first-mode driving signal to the first electrode in the first mode, a first sensing signal receiving unit for receiving a first-mode sensing signal from the second electrode in the first mode, a second driving signal supplying unit for providing a second-mode driving signal to the first electrode and the second electrode in the second mode and a second sensing signal receiving unit for receiving a second-mode sensing signal from the first electrode and the second electrode in the second mode.

* * * * *